US012128455B2

(12) United States Patent
Liu et al.

(10) Patent No.: US 12,128,455 B2
(45) Date of Patent: Oct. 29, 2024

(54) ELECTRICAL CLEANING TOOL FOR WAFER POLISHING TOOL SYSTEM

(71) Applicant: Taiwan Semiconductor Manufacturing Company, Ltd., Hsinchu (TW)

(72) Inventors: Chih-Wen Liu, Taoyuan (TW); Yeo-Sin Lin, Taichung (TW); Shu-Wei Hsu, Taipei (TW); Che-Hao Tu, Hsinchu (TW); Hui-Chi Huang, Zhubei (TW); Kei-Wei Chen, Tainan (TW)

(73) Assignee: Taiwan Semiconductor Manufacturing Company, Ltd., Hsinchu (TW)

( * ) Notice: Subject to any disclaimer, the term of this patent is extended or adjusted under 35 U.S.C. 154(b) by 96 days.

(21) Appl. No.: 17/887,718

(22) Filed: Aug. 15, 2022

(65) Prior Publication Data

US 2024/0050995 A1 Feb. 15, 2024

(51) Int. Cl.

| | |
|---|---|
| ***B08B 3/10*** | (2006.01) |
| ***B08B 1/12*** | (2024.01) |
| ***B24B 37/04*** | (2012.01) |
| ***B24B 37/10*** | (2012.01) |
| ***B24B 37/30*** | (2012.01) |
| ***B24B 57/02*** | (2006.01) |

(52) U.S. Cl.

CPC .................. *B08B 3/10* (2013.01); *B08B 1/12* (2024.01); *B24B 37/044* (2013.01); *B24B 37/046* (2013.01); *B24B 37/105* (2013.01); *B24B 37/30* (2013.01); *B24B 57/02* (2013.01)

(58) Field of Classification Search

None

See application file for complete search history.

(56) References Cited

U.S. PATENT DOCUMENTS

| | | | |
|---|---|---|---|
| 8,336,148 B2 | 12/2012 | Zhang | |
| 9,437,453 B2 | 9/2016 | Zhang | |
| 10,964,551 B2 | 3/2021 | Zhang | |
| 2013/0139851 A1 | 6/2013 | Sin et al. | |
| 2021/0020449 A1* | 1/2021 | Hou | H01L 29/66545 |

OTHER PUBLICATIONS

Ali et al. "A Review on Nanofluids: Fabrication, Stability, and Thermophysical Propert" Journal of Nanomaterials, vol. 2018, Article ID 6978130, 33 pages, published on Jun. 4, 2018.

* cited by examiner

*Primary Examiner* — Eric W Golightly

(74) *Attorney, Agent, or Firm* — Eschweiler & Potashnik, LLC

(57) ABSTRACT

A method comprising: providing a slurry to a polishing pad that is disposed on a wafer platen, the slurry comprising a plurality of electrically charged abrasive particles having a first electrical polarity; moving a first side of a wafer into contact with the slurry and the polishing pad;
applying a first electrical charge having a second electrical polarity, opposite the first electrical polarity, to a first conductive rod; moving the first side of the wafer away from the polishing pad while the first electrical charge is applied to the first conductive rod; moving a first wafer brush into contact with the first side of the wafer; applying a second electrical charge having the second electrical polarity, opposite the first electrical polarity, to a second conductive rod arranged within the first wafer brush; and moving the first wafer brush away from the first side of the wafer.

20 Claims, 26 Drawing Sheets

1700a

1700b

ELECTRICAL CLEANING TOOL FOR WAFER POLISHING TOOL SYSTEM

BACKGROUND

During manufacturing of semiconductor devices, various features are sequentially formed on a wafer resulting in an increasingly non-planar surface of the wafer. Such a non-planar surface is planarized to improve quality and/or uniformity of features subsequently formed on the wafer. Chemical mechanical polishing (CMP) is a wafer processing technique that is used to planarize surfaces of wafers. A CMP process removes excess materials, such as dielectric and/or conductive layers, from a surface of a wafer. The planarization operation can leave contaminants, such as residues of the removed materials, on the planarized surface.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1A:
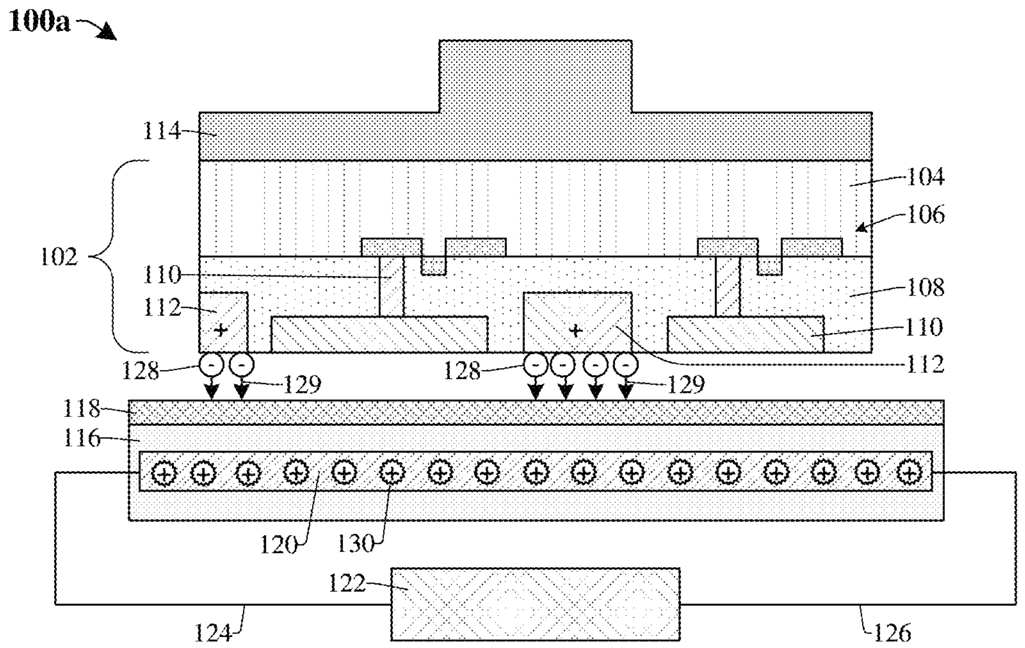
FIG. 1A illustrates a cross-sectional view of some embodiments of an process tool comprising a first conductive rod disposed within a wafer platen.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as “beneath,” “below,” “lower,” “above,” “upper” and the like, may be used herein for ease of description to describe one element or feature’s relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

During integrated chip fabrication, semiconductor wafers often undergo one or more polishing or planarization processes. For example, in some fabrication processes, one or more layers (e.g., dielectric layers, metal layers, semiconductor layers, or some other suitable layers) are deposited over a substrate of a wafer and the layers are subsequently polished and/or planarized using a chemical mechanical polishing (CMP) process or the like. In some CMP processes, a wafer is attached to a wafer carrier and the wafer is positioned over a wafer platen. The wafer and the wafer platen are rotated and a first side of the wafer is brought into contact with a polishing pad that is disposed on a top surface of the platen. An abrasive slurry is dispensed onto the polishing pad to create or increase abrasion between the polishing pad and the first side of the wafer to polish the first side of the wafer. The abrasive slurry includes charged abrasive particles having a first polarity (e.g., a positive electric charge polarity or a negative electric charge polarity).

A challenge with some of these chemical mechanical polishing processes is that after the polishing of the wafer with the abrasive slurry, some of the charged particles from the abrasive slurry may remain along the polished first side of the wafer. For example, the charged abrasive particles may have a negative charge polarity and a first layer along the first side of the wafer may have a positive charge polarity. After the polishing of the first layer, some of the charged abrasive particles may remain on the first layer due to an attractive electrostatic force between the negatively charged abrasive particles and the positively charged first layer. These charged abrasive particles may form defects along the first side of the wafer which may render the wafer defective. Thus, a yield of the wafer fabrication process may be reduced.

Various embodiments of the present disclosure are related to a process tool and a method for removing charged abrasive particles from a wafer after polishing the wafer to reduce defects along the wafer after the polishing. For example, a first wafer cleaning process is performed on the wafer after the polishing. The first wafer cleaning process includes providing a first cleaning fluid to the wafer. A first conductive rod is disposed within a wafer platen and a first charge is applied to the first conductive rod during the first wafer cleaning process. The first charge has a polarity which is opposite the polarity of the charged abrasive particles used during the polishing. Thus, by applying the first charge to the first conductive rod during the first cleaning process, an attractive electrostatic force is created between the first conductive rod and charged abrasive particles on the wafer. The charged abrasive particles may be pulled toward the wafer platen and away from the wafer due to the electrostatic force. As a result, a number of charged abrasive particles on the wafer after the first cleaning process may be reduced.

Further, a second wafer cleaning process is performed on the wafer. The second wafer cleaning process includes providing a second cleaning fluid to the wafer and bringing a first wafer brush into contact with the wafer. A second conductive rod is disposed within a first wafer brush and a second charge is applied to the second conductive rod during the second cleaning process. The polarity of the second charge also is also opposite the polarity of the charged abrasive particles. Thus, by applying the second charge to the second conductive rod during the second cleaning process, an attractive electrostatic force is created between the second conductive rod and charged abrasive particles on the wafer. The charged abrasive particles are pulled toward the wafer brush and away from the wafer due to the electrostatic force. As a result, a number of charged abrasive particles on the wafer after the second cleaning process may be reduced.

Thus, by arranging the first and second conductive rods in the wafer platen and the first wafer brush, respectively, and by applying the first and second charges to the first and second conductive rods during the first and second cleaning processes, respectively, a likelihood of defects existing along the wafer after the polishing may be reduced. As a result, a yield of serviceable wafers may be improved.

FIG. 1A illustrates a cross-sectional view 100*a* of some embodiments of an process tool comprising a first conductive rod 120 disposed within a wafer platen 116.

A wafer 102 is held by a wafer carrier 114 over a wafer platen 116. In some embodiments, the wafer includes a semiconductor substrate 104 and semiconductor devices 106 disposed along the semiconductor substrate 104. Further, a first dielectric layer 108 is disposed along the semiconductor substrate 104, conductive interconnects 110 are disposed within the first dielectric layer 108, and a second dielectric layer 112 is disposed along the first dielectric layer 108.

In some embodiments, the wafer 102 (e.g., a first side of the wafer 102) can be polished by rotating the wafer 102 and bringing the wafer 102 into contact with a polishing pad 118 that is on a top surface of the platen 116. Further, an abrasive slurry comprising charged abrasive particles 128 is provided between the polishing pad 118 and the wafer 102 to polish the wafer 102 using chemical and mechanical abrasion. For example, in some embodiments, the second dielectric layer 112 (or some other layer of the wafer 102) is polished. In some instances, one or more of the charged abrasive particles 128 may remain on the wafer 102 after the polishing. For example, in some embodiments, the charged abrasive particles 128 have a first electric charge (e.g., a negative electric charge) and the second dielectric layer 112 has a second electric charge (e.g., a positive electric charge) having an opposite polarity as the first electric charge. As a result, an attractive electrostatic force exists between the second dielectric layer 112 and the charged abrasive particles 128. Thus, after the polishing, one or more of the charged abrasive particles 128 may remain on the wafer 102 after the polishing due to the attractive electrostatic force.

After the wafer 102 is polished, a first cleaning process is performed to remove debris and/or charged abrasive particles 128 from the wafer 102. For example, the rotating wafer 102 is raised above the polishing pad 118 and a first charge is applied to the first conductive rod 120 disposed within the platen 116. For example, the first conductive rod 120 is coupled to a first voltage supply 122 (e.g., by one or more wires 124, 126) and the first voltage supply 122 applies the first charge to the first conductive rod 120. The first charge has a polarity opposite the polarity of the charged abrasive particles 128 (e.g., as illustrated by charges 130). Thus, during the first cleaning process, an electrostatic force exists between the first conductive rod 120 and the charged abrasive particles 128. By controlling the first charge, the electrostatic force between the first conductive rod 120 and the charged abrasive particles 128 can be made greater than the electrostatic force between the second dielectric layer 112 and the charged abrasive particles 128. As a result, the charged abrasive particles 128 can be pulled toward the first conductive rod 120 and away from the wafer 102 (e.g., as illustrated by arrows 129). Thus, by including the first conductive rod 120 in the platen 116 and by applying the first charge to the first conductive rod 120 during the first cleaning process, a number of charged abrasive particles 128 on the wafer 102 can be reduced. Thus, a likelihood of defects existing along the wafer 102 after the polishing may be reduced and hence a wafer yield may be improved.

Figure 1B:
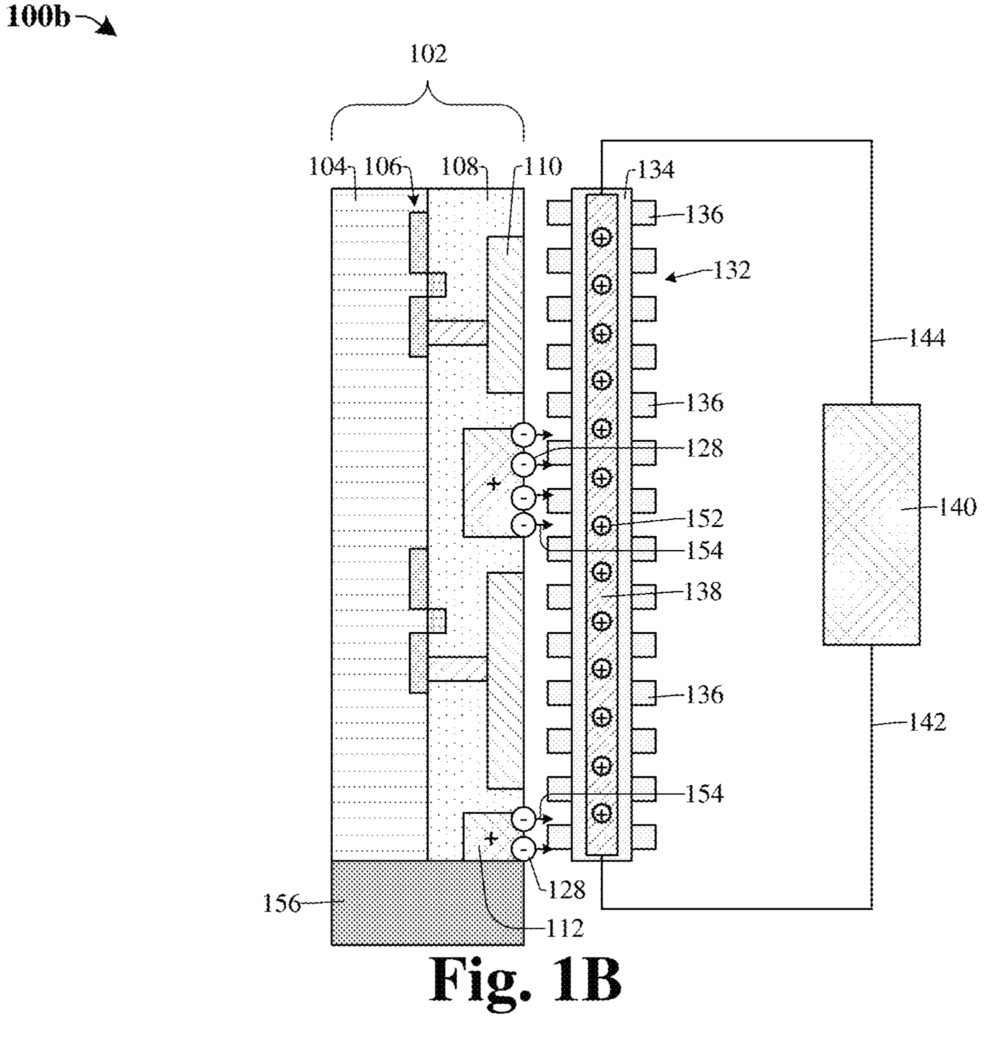
FIG. 1B illustrates a cross-sectional view of some embodiments of a process tool comprising a second conductive rod disposed within a first wafer brush.

FIG. 1B illustrates a cross-sectional view 100*b* of some embodiments of a process tool comprising a second conductive rod 138 disposed within a first wafer brush 132.

The wafer 102 is arranged on one or more wafer rollers 156 and adjacent to the first wafer brush 132. The wafer rollers 156 support the wafer 102. In some embodiments, the first wafer brush 132 includes a brush shaft 134 and a plurality of protrusions 136 along the exterior of the brush shaft 134.

A second cleaning process is performed on the wafer 102 to remove debris and/or abrasive particles 128 from the wafer 102. For example, the wafer 102 is rotated (e.g., by the wafer roller(s) 156) and the first wafer brush 132 is rotated. Further, a second charge is applied to the second conductive rod 138 disposed within the first wafer brush 132. For example, the second conductive rod 138 is coupled to a second voltage supply 140 (e.g., by one or more wires 142, 144) and the second voltage supply 140 applies the second charge to the second conductive rod 138. The second charge has a polarity opposite the polarity of the charged abrasive particles 128 (e.g., as illustrated by charges 152). Thus, during the second cleaning process, an electrostatic force exists between the second conductive rod 138 and the charged abrasive particles 128. By controlling the second charge, the electrostatic force between the second conductive rod 138 and the charged abrasive particles 128 can be made greater than the electrostatic force between the second dielectric layer 112 and the charged abrasive particles 128. As a result, the charged abrasive particles 128 can be pulled toward the second conductive rod 138 and away from the wafer 102 (e.g., as illustrated by arrows 154). Thus, by including the second conductive rod 138 in the first wafer brush 132 and by applying the second charge to the second conductive rod 138 during the second cleaning process, a number of charged abrasive particles 128 on the wafer 102 can be reduced. Thus, a likelihood of defects existing along the wafer 102 after the second cleaning process may be reduced and hence a wafer yield may be further improved.

The charged abrasive particles 128 may have a positive charge polarity or a negative charge polarity. Further, the layer being polished (e.g., the second dielectric layer 112) or some other layer of the wafer 102 may have a positive charge polarity or a negative charge polarity. In some embodiments, the charged abrasive particles 128 may, for example, comprise silicon dioxide, aluminum oxide, or some other suitable materials. In some embodiments, the first dielectric layer 108 and/or the second dielectric layer 112 may, for example, comprise silicon dioxide, silicon nitride, aluminum oxide, or some other suitable material. In some embodiments, the conductive interconnects 110 may, for example, comprise copper, aluminum, tungsten, or some other suitable material. In some embodiments, the first conductive rod(s) 120 and/or the second conductive rod 138 may, for example, comprise copper, aluminum, or some other suitable material. In some embodiments, the first voltage supply 122 and the second voltage supply 140 are direct current (DC) voltage supplies. In some embodiments, the semiconductor devices 106 may, for example, be or comprise transistor devices or some other suitable semiconductor devices.

Figure 2:
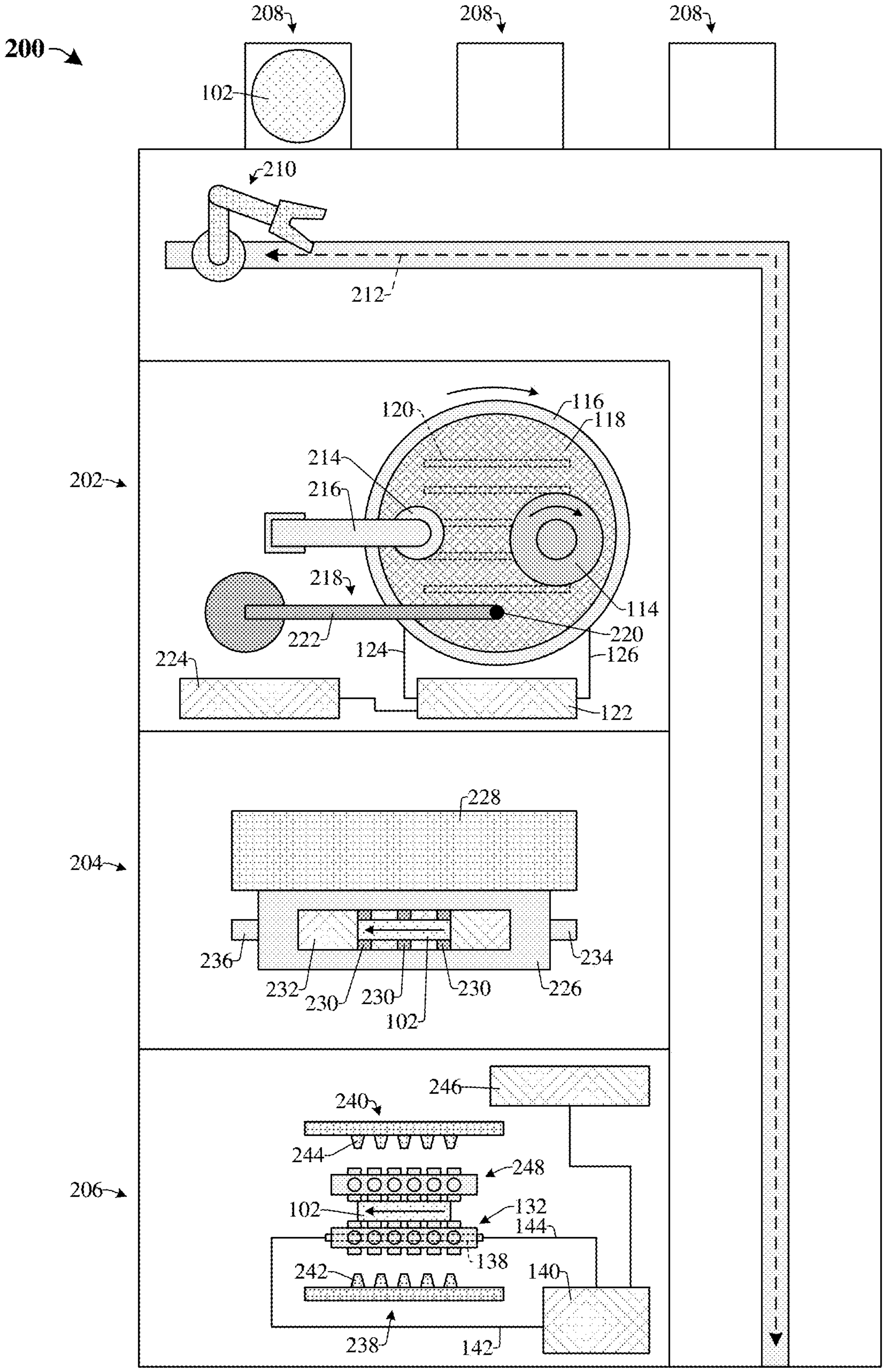
FIG. 2 illustrates a top view of some embodiments of a process tool system comprising a plurality of process tool components for polishing a wafer.

FIG. 2 illustrates a top view 200 of some embodiments of a process tool system comprising a plurality of process tool components for polishing a wafer 102.

The process tool system includes a polishing module 202, a mega-sonic module 204, a brushing module 206, and loading modules 208. A wafer transport robot 210 is configured to move along a transport path 212 to transport the wafer 102 between the modules 202, 204, 206, 208.

The polishing module 202 includes the wafer platen 116 and the polishing pad 118 on the wafer platen 116. The wafer carrier 114 is over the wafer platen 116. A pad conditioner 214 for conditioning the polishing pad 118 is over the wafer platen 116. In some embodiments, the pad conditioner 214 may be or comprise a diamond disk. In some embodiments, the pad conditioner 214 is affixed to a conditioner arm 216. A slurry dispenser 218 is over the platen 116. The slurry dispenser 218 comprises one or more nozzles 220 along a slurry arm 222.

The one or more first conductive rods 120 are disposed within the platen 116. The first conductive rods 120 are coupled to the first voltage supply 122. In some embodiments, a first controller 224 is coupled to the first voltage supply 122. The first controller 224 is configured to control the first voltage supply 122. For example, the first controller 224 is configured to control a voltage level of the first voltage supply 122, a polarity of the first voltage supply 122, and a switching (e.g., ON or OFF) of the first voltage supply 122. In some embodiments, the first controller 224 comprises processing circuitry.

The mega-sonic module 204 includes a primary tank 226 and an overflow tank 228. Wafer rollers 230 are disposed within the primary tank 226 and are configured to hold and rotate the wafer 102 over a transducer 232. In some embodiments, the primary tank 226 includes an inlet 234 and an outlet 236.

The brushing module 206 includes the first wafer brush 132 and the wafer roller (e.g., 156 of FIG. 1B). In some embodiments, the brushing module 206 further includes a second wafer brush 248, a first spray bar 238, and a second spray bar 240. The first wafer brush 132 is configured to clean a first side of a wafer 102 and the second wafer brush 248 is configured to clean a second side of the wafer 102. The second wafer brush 248 has a second shaft (not labeled) and second protrusions (not labeled). The first spray bar 238 is configured to dispense the second cleaning fluid from first nozzles 242 onto the first side of the wafer 102 and the second spray bar 240 is configured to dispense the second cleaning fluid from second nozzles 244 onto the second side of the wafer 102.

The second conductive rod 138 is disposed within the first wafer brush 132. In some embodiments, a second controller 246 is coupled to the second voltage supply 140. The second controller 246 is configured to control the second voltage supply 140. For example, the second controller 246 is configured to control a voltage level of the second voltage supply 140, a polarity of the second voltage supply 140, and a switching of the second voltage supply 140. In some embodiments, the second controller 246 comprises processing circuitry.

Figure 3A:
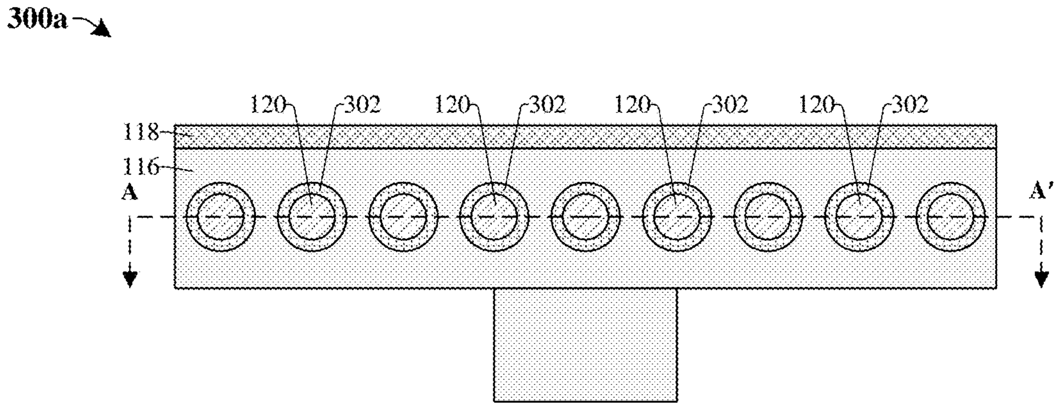
FIG. 3A illustrates a cross-sectional view of some embodiments of the process tool of FIG. 1A in which first dielectric films surround the first conductive rods.
Figure 3B:
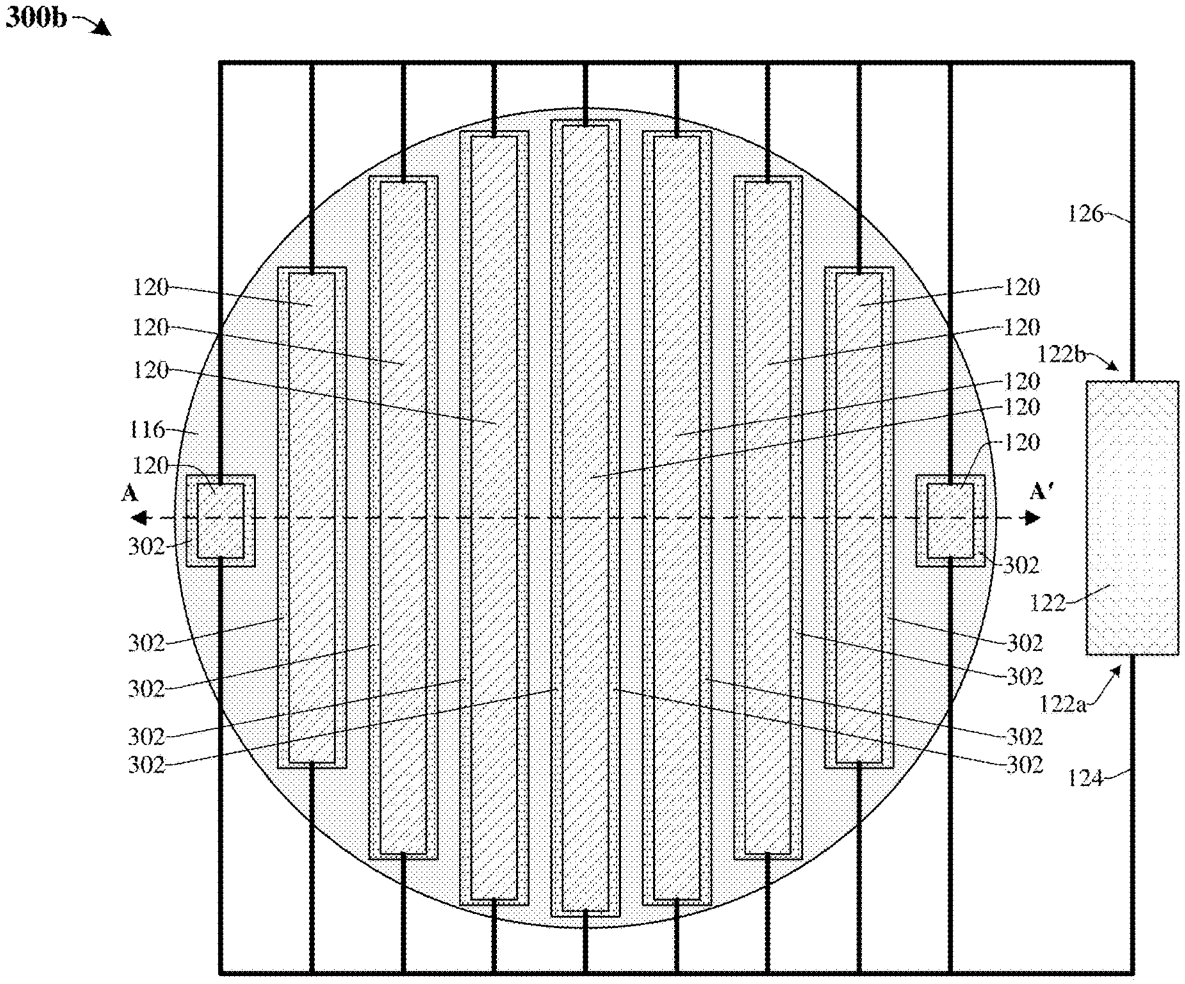
FIG. 3B illustrates a top view of some embodiments of the process tool of FIG. 3A.

FIG. 3A illustrates a cross-sectional view 300*a* of some embodiments of the process tool of FIG. 1A in which first dielectric films 302 surround the first conductive rods 120. FIG. 3B illustrates a top view 300*b* of some embodiments of the process tool of FIG. 3A. In some embodiments, cross-sectional view 300*a* of FIG. 3A may, for example, be taken across line A-A' of FIG. 3B and/or top view 300*b* of FIG. 3B may be taken across line A-A' of FIG. 3A.

In some embodiments, the first dielectric films 302 separate the first conductive rods 120 from the wafer platen 116. For example, in some embodiments, the first conductive rods 120 comprise a first conductive material, the wafer platen 116 comprises a second conductive material, and the first dielectric films 302 electrically isolate the first conductive rods 120 from the wafer platen 116.

Figure 6A:
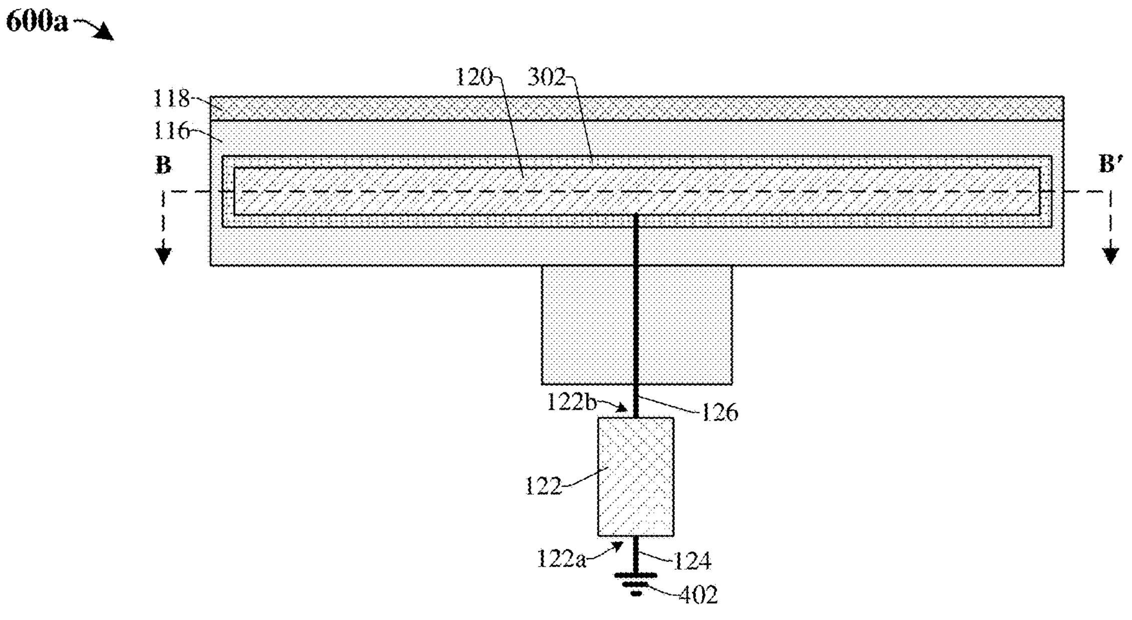
FIG. 6A illustrates a cross-sectional view of some embodiments of the process tool of FIG. 1A in which a single first conductive rod is disposed within the wafer platen.
Figure 6B:
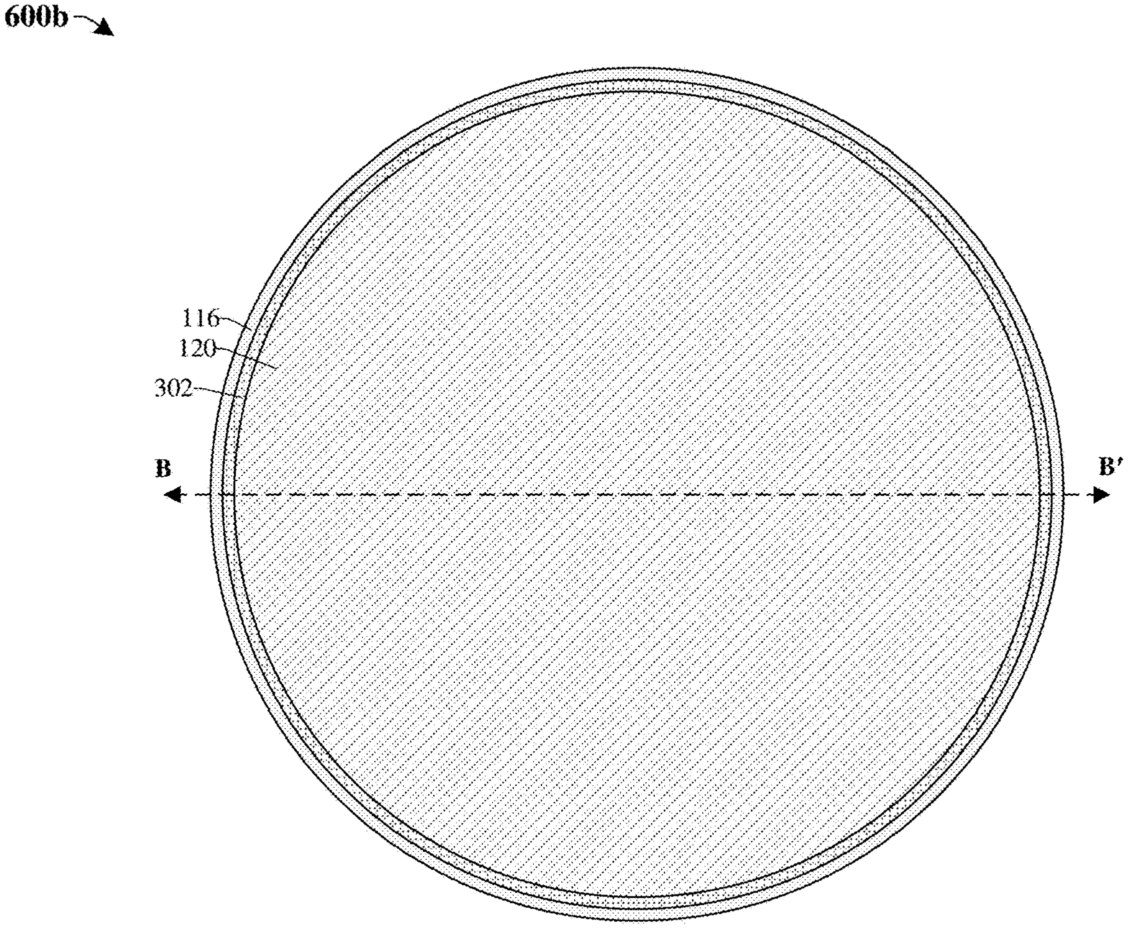
FIG. 6B illustrates a top view of some embodiments of the process tool of FIG. 6A.

In some embodiments, the first conductive rod(s) 120 are coupled to a first terminal 122*a* and a second terminal 122*b* of the first voltage supply 122 by a first wire 124 and a second wire 126, respectively. In some embodiments, the first conductive rods 120 are coupled in parallel to the first voltage supply 122. For example, in some embodiments, first ends of the first conductive rods 120 are coupled to the first terminal 122*a* of the first voltage supply 122 via the first wire 124 and second ends of the first conductive rods 120 are coupled to the second terminal 122*b* of the first voltage supply 122 via the second wire 126. In some other embodiments (e.g., as illustrated in FIGS. 6A, 6B), the second terminal 122*b* of the first voltage supply 122 is coupled to the first conductive rods 120 by the second wire 126 and the first terminal 122*a* of the first voltage supply 122 is coupled to ground (e.g., 402 of FIGS. 4A, 4B) by the first wire 124.

In some embodiments, some first conductive rods 120 have different lengths than other first conductive rods 120. In some embodiments, the first conductive rods 120 are substantially parallel to one another. In some other embodiments, the first conductive rods 120 may have a spiral shape or some other suitable shape.

Figure 4A:
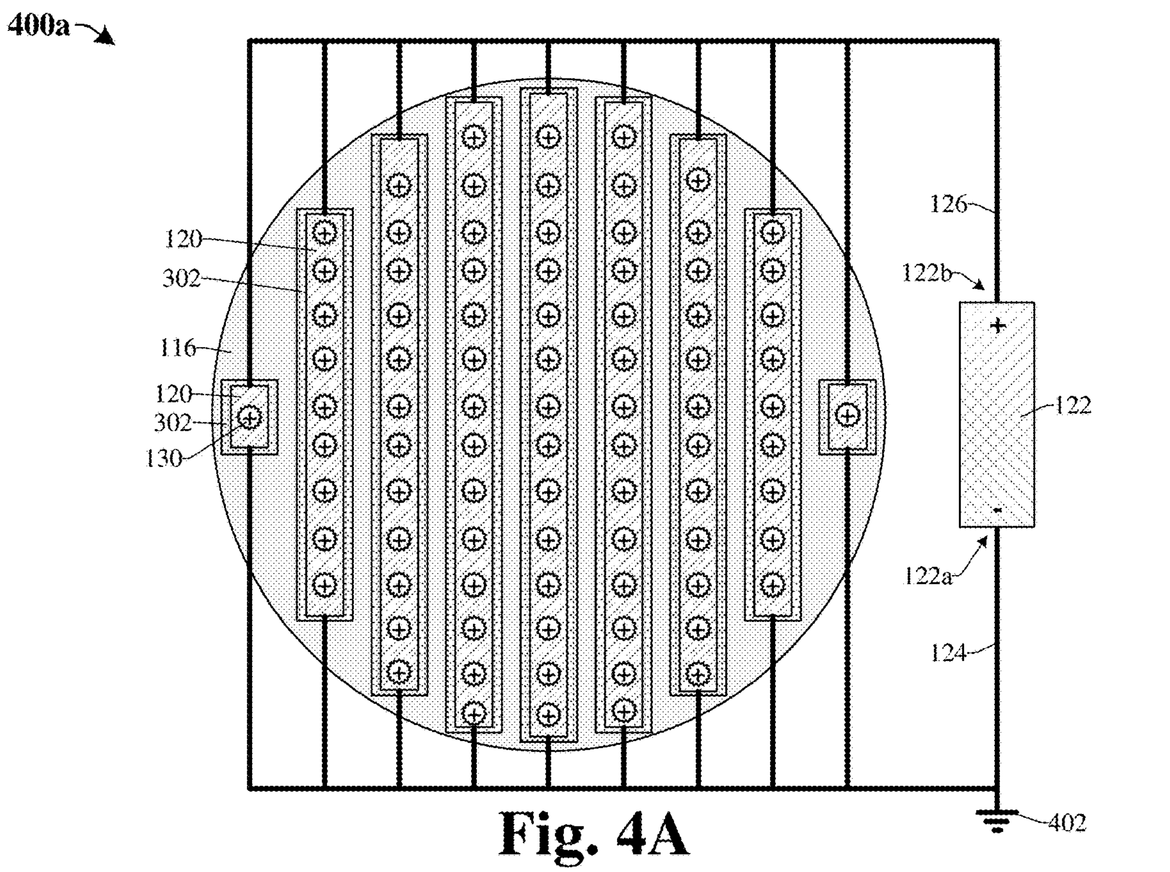
FIG. 4A illustrates a top view of some embodiments of the process tool of FIG. 3B in which the first conductive rods are positively charged.

FIG. 4A illustrates a top view 400*a* of some embodiments of the process tool of FIG. 3B in which the first conductive rods 120 are positively charged.

In some embodiments, the first terminal 122*a* of the first voltage supply 122 is the negative terminal of the first voltage supply 122 and the second terminal 122*b* of the first voltage supply 122 is the positive terminal of the first voltage supply 122. Further, the first terminal 122*a* and the first wire 124 are coupled to ground 402. Thus, the first conductive rods 120 may be positively charged (e.g., relative to ground 402). For example, the voltage across the first voltage supply 122 may be set to a first positive voltage (e.g., approximately 5 volts or some other suitable value). Thus, the voltage at the second terminal 122*b* is approximately equal to the first positive voltage (e.g., 5 volts) and the voltage at the first terminal 122*a* is approximately zero volts because the first terminal 122*a* is coupled to ground 402. The first wire 124 and the second wire 126 may have resistances while resistances of the first conductive rods 120 may be approximately zero. Thus, a first voltage drop (e.g., approximately 2.5 volts) may occur across the second wire 126 due to the resistance of the second wire 126, approximately zero voltage drop may occur across the first conductive rods 120, and a second voltage (e.g., approximately 2.5 volts) drop may occur across the first wire 124 due to the resistance of the first wire 124. Thus, the voltage at the first conductive rods 120 is positive (e.g., approximately 2.5 volts) and hence the first conductive rods are positively charged.

Figure 4B:
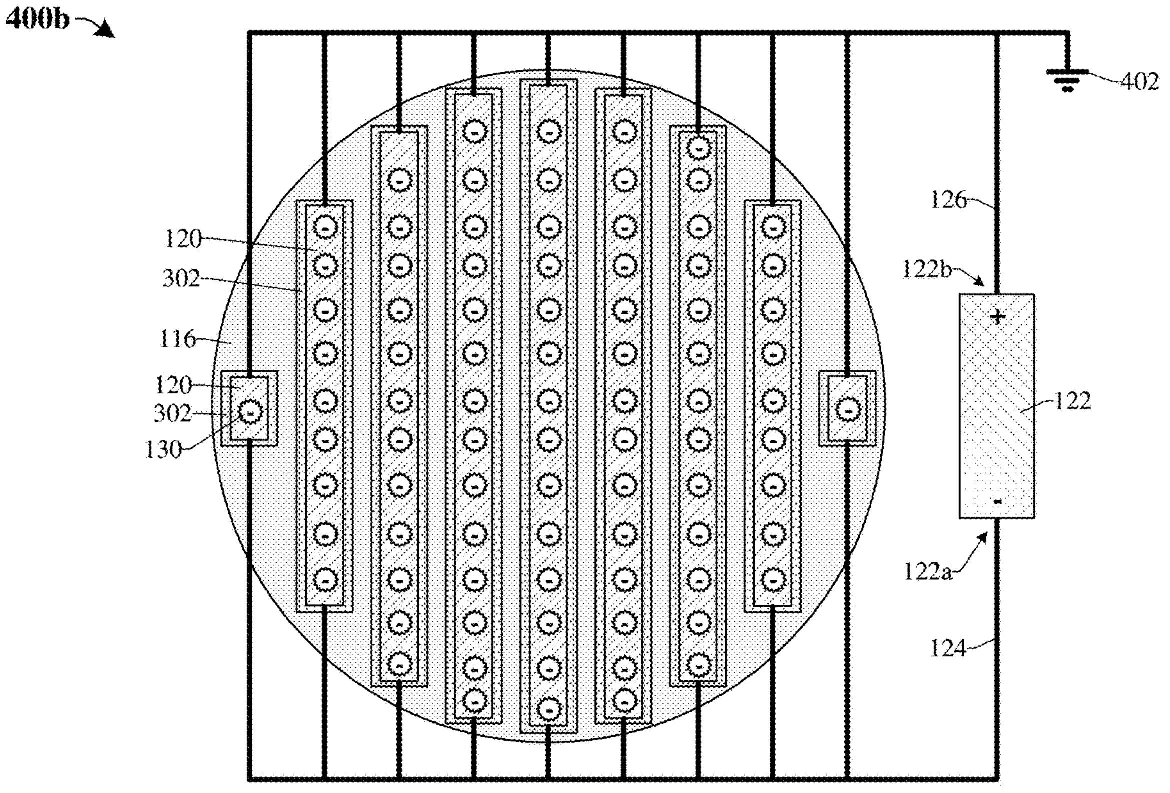
FIG. 4B illustrates a top view of some embodiments of the process tool of FIG. 3B in which the first conductive rods are negatively charged.

FIG. 4B illustrates a top view 400*b* of some embodiments of the process tool of FIG. 3B in which the first conductive rods 120 are negatively charged.

In some embodiments, the second terminal 122*b* and the second wire 126 are coupled to ground 402. Thus, the first conductive rods 120 may be negatively charged (e.g., relative to ground 402). For example, the voltage across the first voltage supply 122 may be set to the first positive voltage (e.g., approximately 5 volts or some other suitable value). Thus, the voltage at the first terminal 122*a* is approximately equal to the negation of the first positive voltage (e.g., −5 volts) and the voltage at the second terminal is approximately zero volts because the second terminal 122*b* is coupled to ground 402. A first voltage drop (e.g., approximately 2.5 volts) may occur across the second wire 126 due to the resistance of the second wire 126, approximately zero voltage drop may occur across the first conductive rods 120, and a second voltage drop (e.g., approximately 2.5 volts) may occur across the first wire 124 due to the resistance of the first wire 124. Thus, the voltage at the first conductive rods 120 is negative (e.g., approximately −2.5 volts) and hence the first conductive rods are negatively charged.

Figure 5:
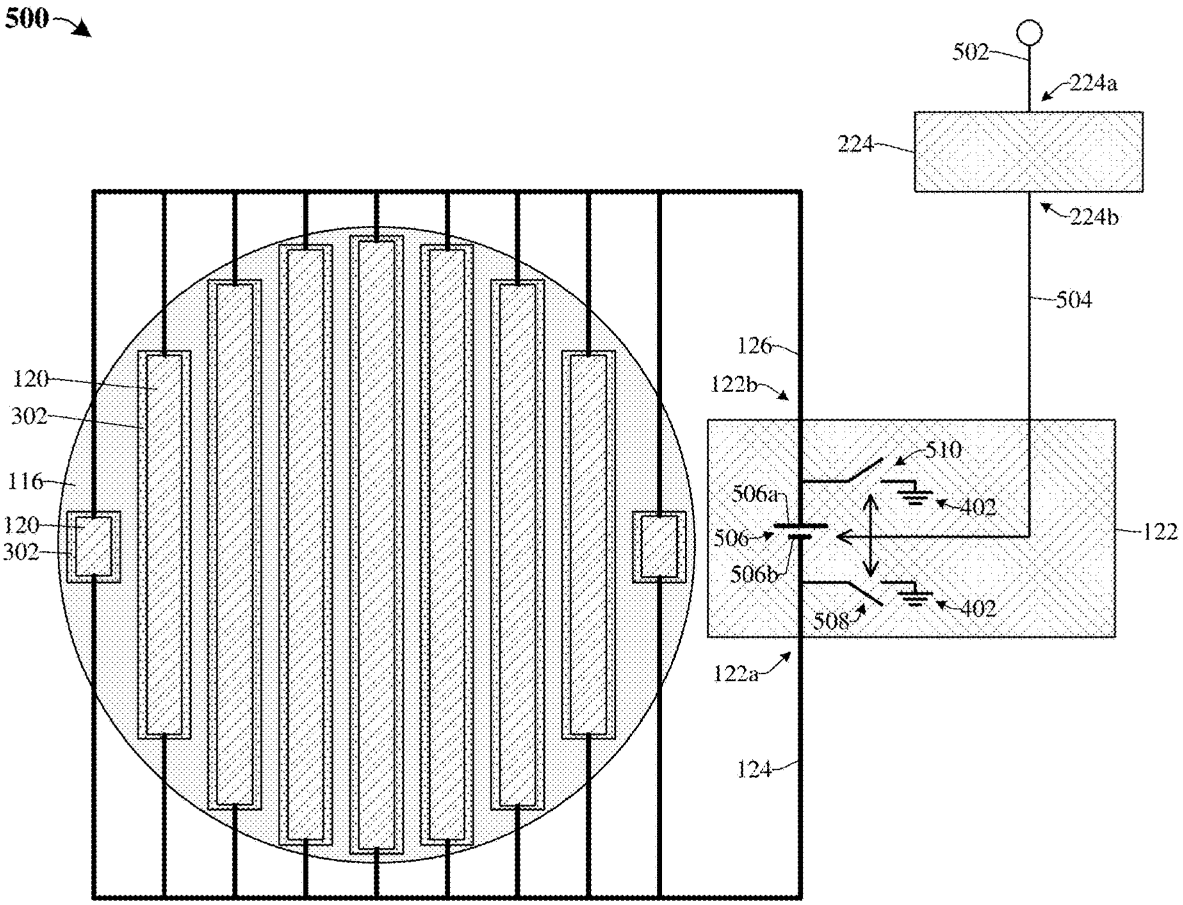
FIG. 5 illustrates a top view of some embodiments of the process tool of FIG. 3B in which the first controller is coupled to the first voltage supply.

FIG. 5 illustrates a top view 500 of some embodiments of the process tool of FIG. 3B in which the first controller 224 is coupled to the first voltage supply 122.

In some embodiments, the first controller 224 has an input 224*a* coupled to a first input terminal 502 and an output 224*b* coupled to a first control terminal 504. In some embodiments, the first voltage supply 122 includes a first voltage source 506 (e.g., a first DC voltage source) having a positive terminal 506*a* and a negative terminal 506*b*. The positive terminal 506*a* is coupled to the second terminal 122*b* of the first voltage supply 122 and the negative terminal 506*b* is coupled to the first terminal 122*a* of the first voltage supply 122. In some embodiments, the first voltage supply 122 further includes a first switch 508 and a second switch 510. The first switch 508 selectively couples the negative terminal 506*b* to ground 402. The second switch 510 selectively couples the positive terminal 506*a* to ground 402.

In some embodiments, the first voltage source 506, the first switch 508, and the second switch 510 are controlled by the first control terminal 504 of the first controller 224. For example, the first control terminal 504 may include a first wire (not shown) coupled to a control terminal (not shown) of the first voltage source 506 and a second wire (not shown) coupled to both a control terminal (not shown) of the first switch 508 and a control terminal (not shown) of the second switch 510. The first controller 224 is configured to control the voltage (e.g., voltage magnitude) across the first voltage source 506, the state (e.g., ON or OFF) of the first switch 508, and the state of the second switch 510 via the first control terminal 504. For example, the first controller 224 may set the voltage across the first voltage source 506 to some voltage within a range from about 0.5 to 100 volts or some other suitable range. Further, to positively charge the first conductive rods 120, the first controller 224 may close (e.g., turn ON) the first switch 508 and open (e.g., turn OFF) the second switch 510, thereby coupling the negative terminal 506*b* to ground 402 (e.g., as shown in FIG. 4A). Conversely, to negatively charge the first conductive rods 120, the first controller 224 may open (e.g., turn OFF) the first switch 508 and close (e.g., turn ON) the second switch 510, thereby coupling the positive terminal 506*a* to ground 402 (e.g., as shown in FIG. 4B).

The first controller 224 may set the voltage of the first voltage source 506 and the switching of the first and second switches 508, 510 based on a signal at the first input terminal 502 (e.g., a user input signal, an automated input signal, or the like). For example, if a slurry having negatively charged abrasive particles is used during polishing, that information may be provided to the first controller 224 via the first input terminal 502. The first controller 224 can then control the voltage of the first voltage source 506 and the switching of the first and second switches 508, 510 so the first conductive rods 120 are positively charged to remove the negatively charged abrasive particles during the first cleaning process.

FIG. 6A illustrates a cross-sectional view 600*a* of some embodiments of the process tool of FIG. 1A in which a single first conductive rod 120 is disposed within the wafer platen 116. FIG. 6B illustrates a top view 600*b* of some embodiments of the process tool of FIG. 6A. In some embodiments, cross-sectional view 600*a* of FIG. 6A may, for example, be taken across line B-B' of FIG. 6B and/or top view 600*b* of FIG. 6B may be taken across line A-A' of FIG. 6A.

In some embodiments, the first conductive rod 120 is plate-shaped and continuously extends along a perimeter of the wafer platen 116. In some embodiments, the second terminal 122*b* of the first voltage supply 122 is coupled to the first conductive rod 120 by the second wire 126 and the first terminal 122*a* of the first voltage supply 122 is coupled to ground 402 by the first wire 124. In some other embodiments (e.g., as illustrated in FIGS. 3A, 3B), a first side of the first conductive rod 120 is coupled to the first terminal 122*a* of the first voltage supply 122 via the first wire 124 and a second side of the first conductive rod 120 is coupled to the second terminal 122*b* of the first voltage supply 122 via the second wire 126.

Figure 7A:
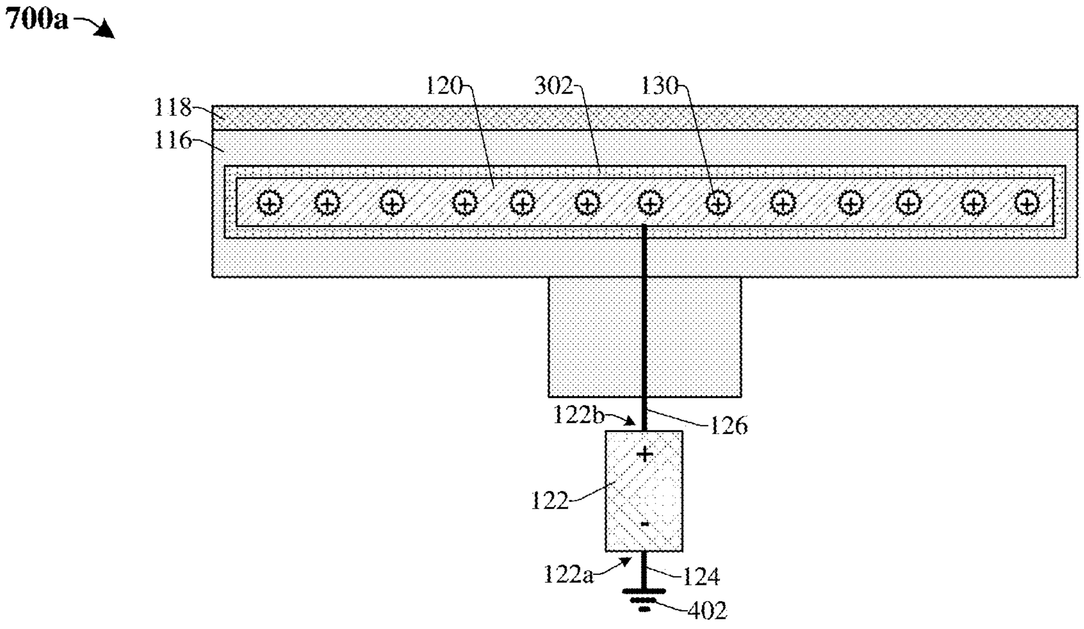
FIG. 7A illustrates a top view of some embodiments of the process tool of FIG. 6B in which the first conductive rod is positively charged.

FIG. 7A illustrates a top view 700*a* of some embodiments of the process tool of FIG. 6B in which the first conductive rod 120 is positively charged.

In some embodiments, the first terminal 122*a* of the first voltage supply 122 is the negative terminal of the first voltage supply 122 and the second terminal 122*b* of the first voltage supply 122 is the positive terminal of the first voltage supply 122. Further, the first terminal 122*a* is coupled to ground 402. Thus, the first conductive rod 120 may be positively charged (e.g., relative to ground 402). For example, the voltage across the first voltage supply 122 may be set to a first positive voltage (e.g., approximately 5 volts or some other suitable value). Thus, the voltage at the second terminal 122*b* is approximately equal to the first positive voltage (e.g., 5 volts) and the voltage at the first terminal 122*a* is approximately zero volts because the first terminal 122*a* is coupled to ground 402. As a result, the voltage at the first conductive rod 120 is positive (e.g., approximately 5 volts) and hence the first conductive rod 120 is positively charged.

Figure 7B:
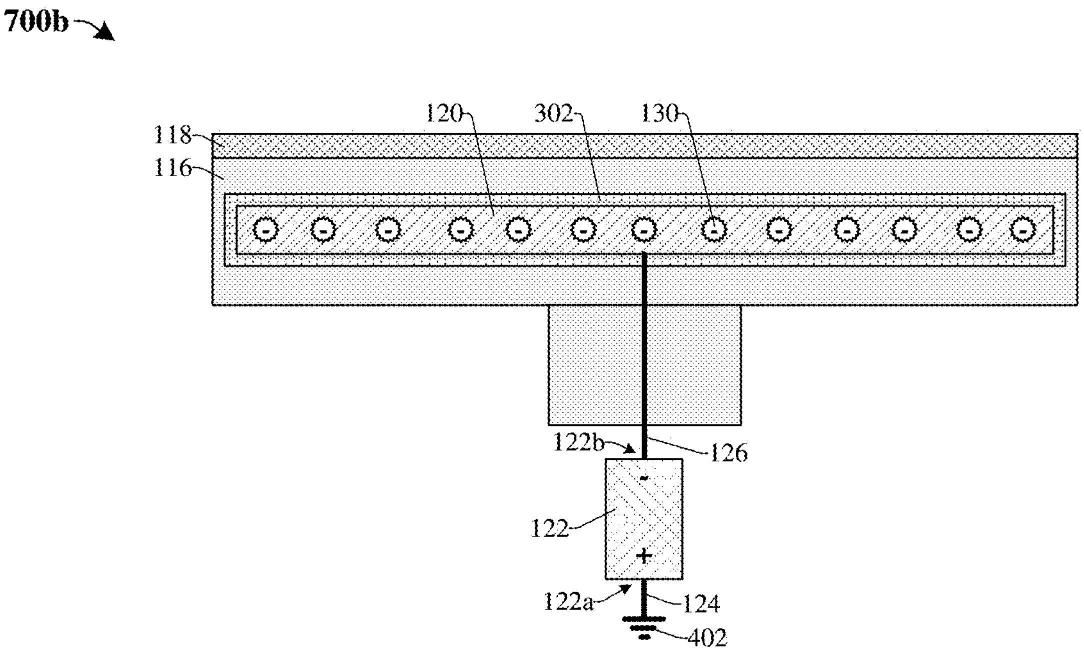
FIG. 7B illustrates a top view of some embodiments of the process tool of FIG. 6B in which the first conductive rod is negatively charged.

FIG. 7B illustrates a top view 700*b* of some embodiments of the process tool of FIG. 6B in which the first conductive rod 120 is negatively charged.

In some embodiments, the first terminal 122*a* of the first voltage supply 122 is the positive terminal of the first voltage supply 122 and the second terminal 122*b* of the first voltage supply 122 is the negative terminal of the first voltage supply 122. Further, the first terminal 122*a* is coupled to ground 402. Thus, the first conductive rod 120 may be negatively charged (e.g., relative to ground 402). For example, the voltage across the first voltage supply 122 may be set to a first positive voltage (e.g., approximately 5 volts or some other suitable voltage). Thus, the voltage at the second terminal 122*a* is approximately equal to the negation of the first positive voltage (e.g., −5 volts) and the voltage at the first terminal 122*a* is approximately zero volts because the first terminal 122*a* is coupled to ground 402. As a result, the voltage at the first conductive rod 120 is negative (e.g., approximately −5 volts) and hence the first conductive rod 120 is negatively charged.

Figure 8:
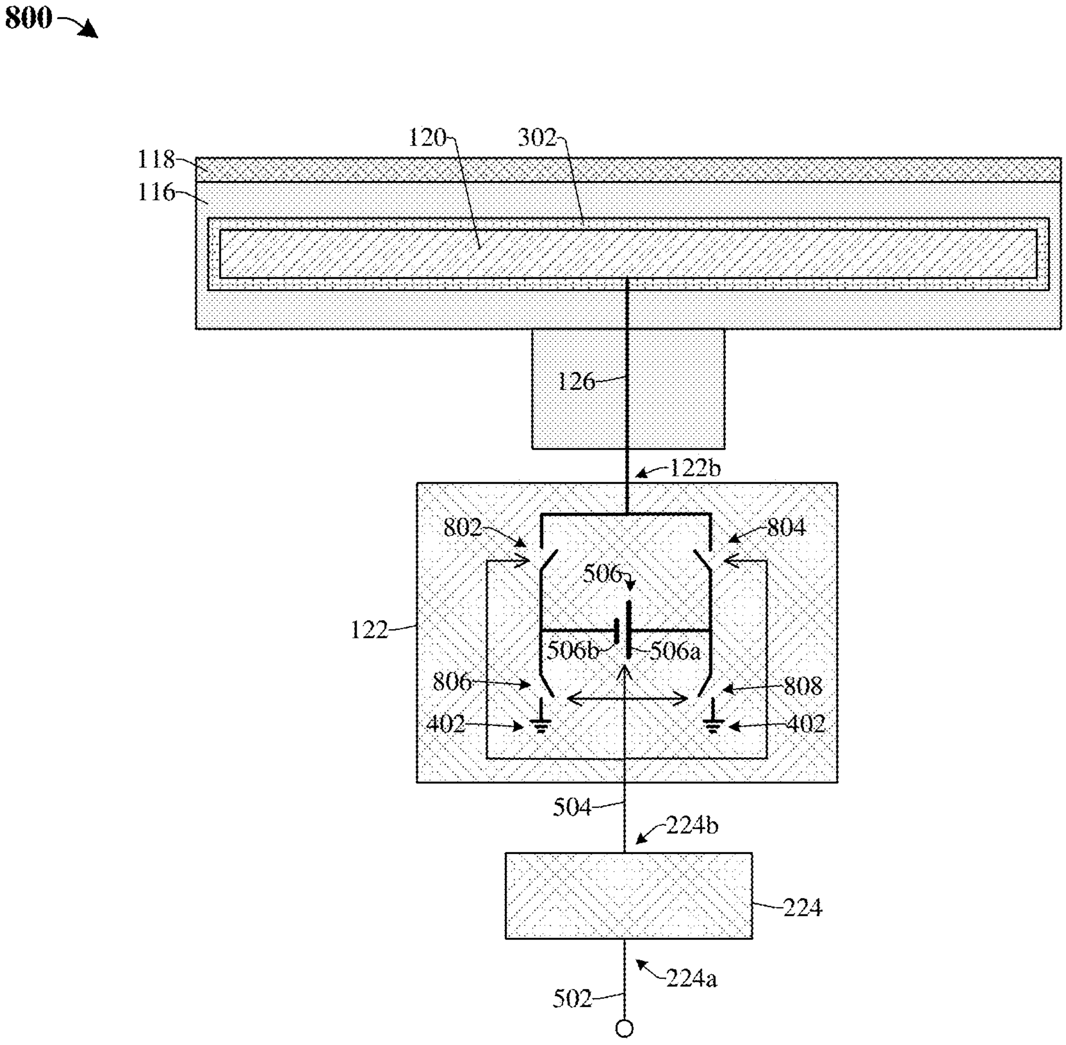
FIG. 8 illustrates a top view of some embodiments of the process tool of FIG. 6B in which the first controller is coupled to the first voltage supply.

FIG. 8 illustrates a top view 800 of some embodiments of the process tool of FIG. 6B in which the first controller 224 is coupled to the first voltage supply 122.

In some embodiments, the second terminal 122*b* is coupled to the first conductive rod 120. In some embodiments, the first voltage supply 122 includes a first switch 802, a second switch 804, a third switch 806, and a fourth switch 808. The first switch 802 selectively couples the negative terminal 506*b* of the first voltage source 506 to the first conductive rod 120 (e.g., via the second terminal 122*b*). The second switch 804 selectively couples the positive terminal 506*a* of the first voltage source 506 to the first conductive rod 120. The third switch 806 selectively couples the negative terminal 506*b* of the first voltage source 506 to ground 402. The fourth switch 808 selectively couples the positive terminal 506*a* of the first voltage source 506 to ground 402.

In some embodiments, the first voltage source 506, the first switch 802, the second switch 804, the third switch 806, and the fourth switch 808 are controlled by the first control terminal 504 of the first controller 224. For example, the first control terminal 504 may include a first wire (not shown) coupled to a control terminal (not shown) of the first voltage source 506. Further, the first control terminal 504 may include a second wire (not shown) coupled to a control terminal (not shown) of the first switch 802, a control terminal (not shown) of the second switch 804, a control terminal (not shown) of the third switch 806, and a control terminal (not shown) of the fourth switch 808. The first controller 224 is configured to control the voltage (e.g., voltage magnitude) across the first voltage source 506 and the states (e.g., ON or OFF) of the switches 802, 804, 806, 808 via the first control terminal 504. For example, the first controller 224 may set the voltage across the first voltage source 506. Further, to positively charge the first conductive rod(s) 120, the first controller 224 may open (e.g., turn OFF) the first switch 802, close (e.g., turn ON) the second switch 804, close the third switch 806, and open the fourth switch 808, thereby coupling the positive terminal 506*a* to the first conductive rod 120 and the negative terminal 506*b* to ground 402 (e.g., as shown in FIG. 7A). Conversely, to negatively charge the first conductive rod(s) 120, the first controller 224 may close (e.g., turn ON) the first switch 802, open (e.g., turn OFF) the second switch 804, open the third switch 806, and close the fourth switch 808, thereby coupling the negative terminal 506*b* to the first conductive rod 120 and the positive terminal 506*a* to ground 402 (e.g., as shown in FIG. 7B).

Figure 9A:
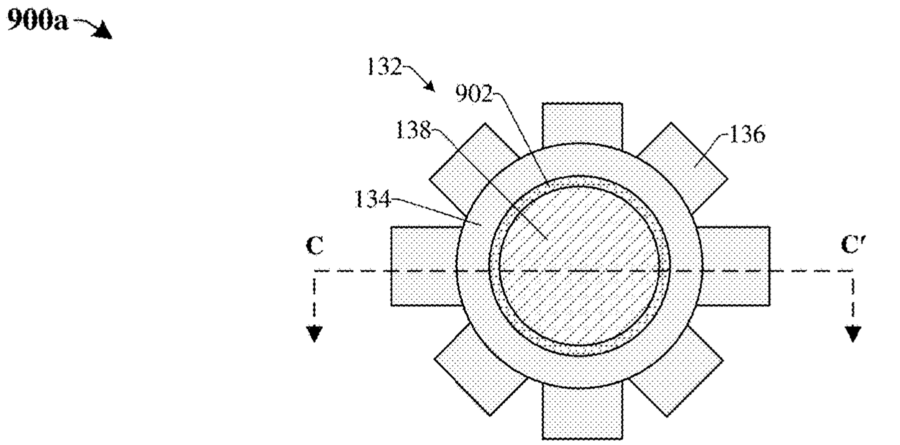
FIG. 9A and FIG. 9B illustrate cross-sectional views of some embodiments of the process tool of FIG. 1B in which a second dielectric film surrounds the second conductive rod.
Figure 9B:
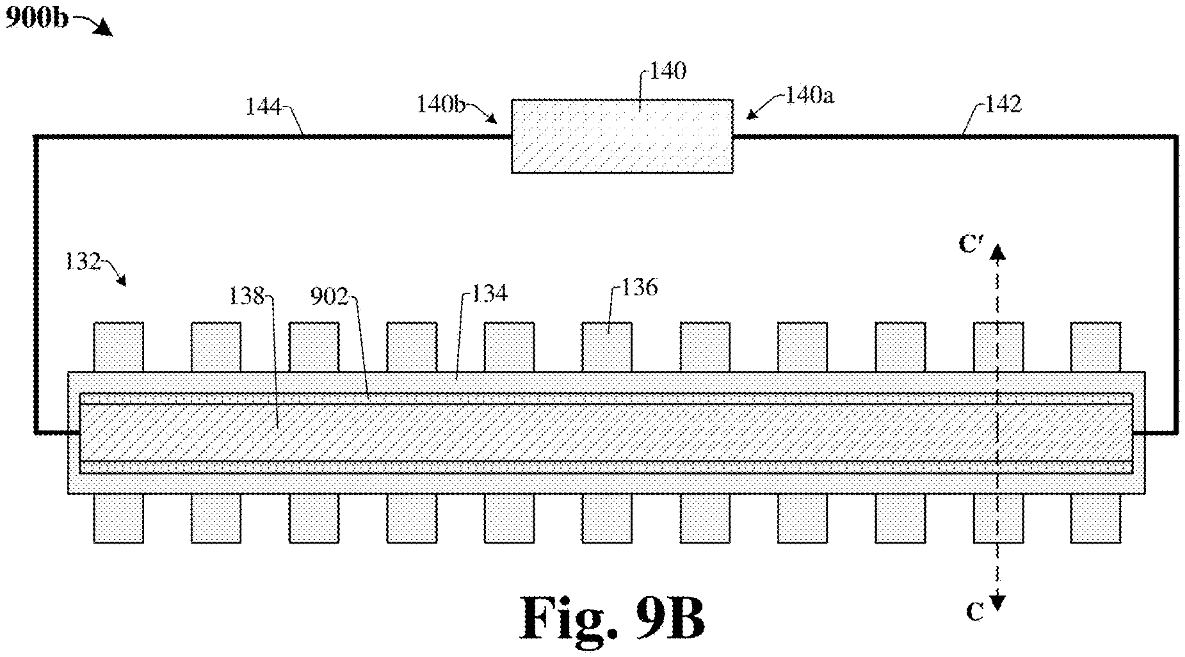

FIG. 9A and FIG. 9B illustrate cross-sectional views 900*a*, 900*b* of some embodiments of the process tool of FIG. 1B in which a second dielectric film 902 surrounds the second conductive rod 138. In some embodiments, cross-sectional view 900*a* of FIG. 9A may, for example, be taken across line C-C' of FIG. 9B and/or cross-sectional view 900*b* of FIG. 9B may be taken across line C-C' of FIG. 9A.

In some embodiments, the second dielectric film 902 separates the second conductive rod 138 from the brush shaft 134. In some other embodiments (e.g., as shown in FIG. 1B), the second conductive rod 138 is in direct contact with the brush shaft 134. The second conductive rod 138 extends through a center of the first wafer brush 132 from a first end of the first wafer brush 132 to a second end of the first wafer brush 132, opposite the first end. In some embodiments, the second conductive rod 138 is coupled to a first terminal 140*a* and a second terminal 140*b* of the second voltage supply 140 by a first wire 142 and a second wire 144, respectively. For example, in some embodiments, a first end of the second conductive rod 138 is coupled to the first terminal 140*a* of the second voltage supply 140 via the first wire 142 and a second end of the second conductive rod 138 is coupled to the second terminal 140*b* of the second voltage supply 140 via the second wire 144.

Figure 10A:
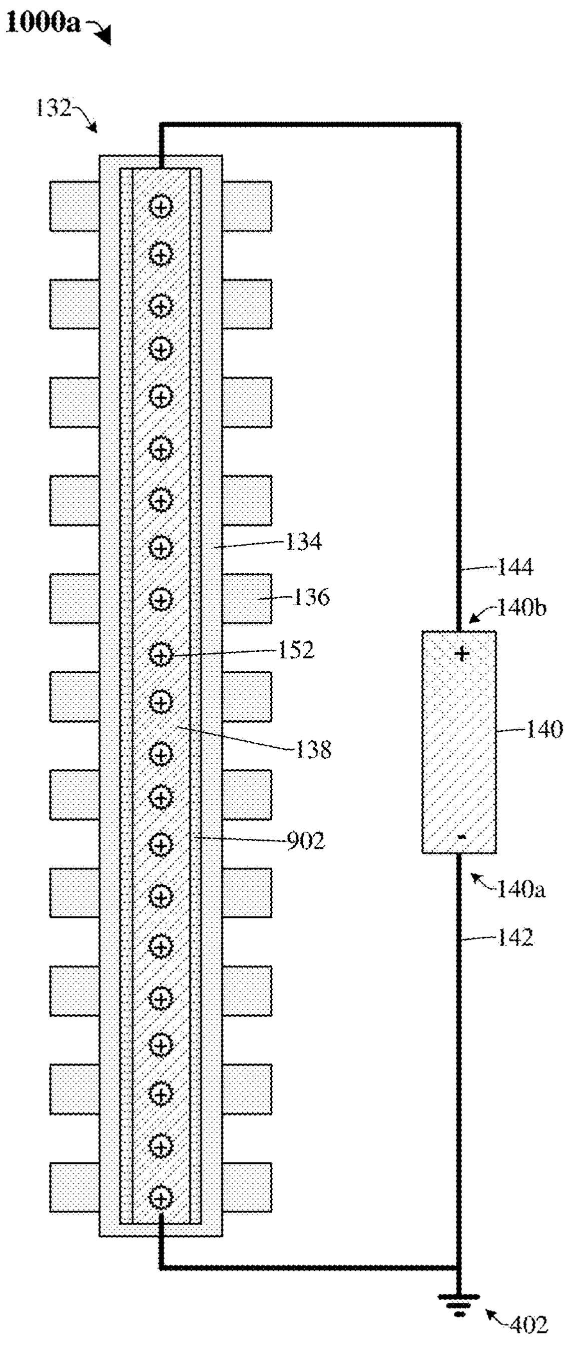
FIG. 10A illustrates a top view of some embodiments of the process tool of FIG. 9B in which the second conductive rod is positively charged.

FIG. 10A illustrates a top view 1000*a* of some embodiments of the process tool of FIG. 9B in which the second conductive rod 138 is positively charged.

In some embodiments, the first terminal 140*a* of the second voltage supply 140 is the negative terminal of the second voltage supply 140 and the second terminal 140*b* of the second voltage supply 140 is the positive terminal of the second voltage supply 140. Further, the first terminal 140*a* and the first wire 142 are coupled to ground 402. Thus, the second conductive rod 138 may be positively charged (e.g., relative to ground 402). For example, the voltage across the second voltage supply 140 may be set to a first positive voltage (e.g., approximately 5 volts or some other suitable voltage). Thus, the voltage at the second terminal 140*b* is approximately equal to the first positive voltage (e.g., 5 volts) and the voltage at the first terminal 140*a* is approximately zero volts because the first terminal 140*a* is coupled to ground 402. The first wire 142 and the second wire 144 may have resistances while resistances of the second conductive rod 138 may be approximately zero. Thus, a first voltage drop (e.g., approximately 2.5 volts) may occur across the second wire 144 due to the resistance of the second wire 144, approximately zero voltage drop may occur across the second conductive rod 138, and a second voltage drop (e.g., approximately 2.5 volts) may occur across the first wire 142 due to the resistance of the first wire 142. Thus, the voltage at the second conductive rod 138 is positive (e.g., approximately 2.5 volts) and hence the second conductive rod 138 is positively charged.

Figure 10B:
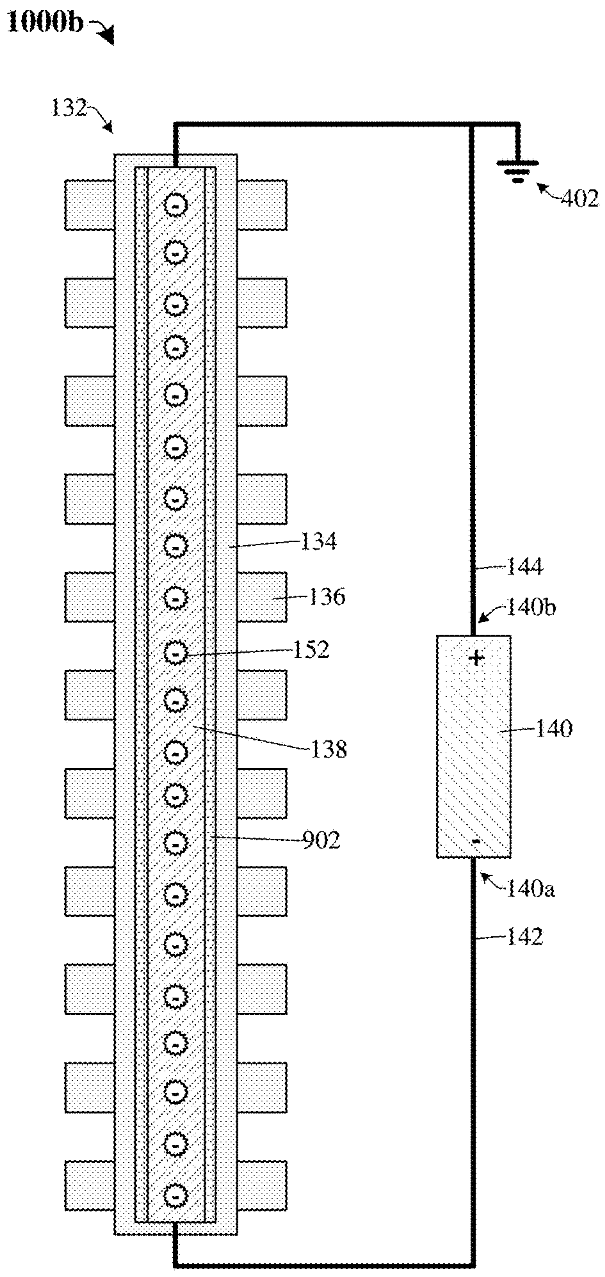
FIG. 10B illustrates a top view of some embodiments of the process tool of FIG. 9B in which the second conductive rod is negatively charged.

FIG. 10B illustrates a top view 1000*b* of some embodiments of the process tool of FIG. 9B in which the second conductive rod 138 is negatively charged.

In some embodiments, the second terminal 140*b* and the second wire 144 are coupled to ground 402. Thus, the second conductive rod 138 may be negatively charged (e.g., relative to ground 402). For example, the voltage across the second voltage supply 140 may be set to the first positive voltage (e.g., approximately 5 volts or some other suitable voltage). Thus, the voltage at the first terminal 140*a* is approximately equal to the negation of the first positive voltage (e.g., −5 volts) and the voltage at the second terminal 140*b* is approximately zero volts because the second terminal 140*b* is coupled to ground 402. A first voltage drop (e.g., approximately 2.5 volts) may occur across the second wire 144 due to the resistance of the second wire 144, approximately zero voltage drop may occur across the second conductive rod 138, and a second voltage drop (e.g., approximately 2.5 volts) may occur across the first wire 142 due to the resistance of the first wire 142. Thus, the voltage at the second conductive rod 138 is negative (e.g., approximately −2.5 volts) and hence the second conductive rod is negatively charged.

Figure 11:
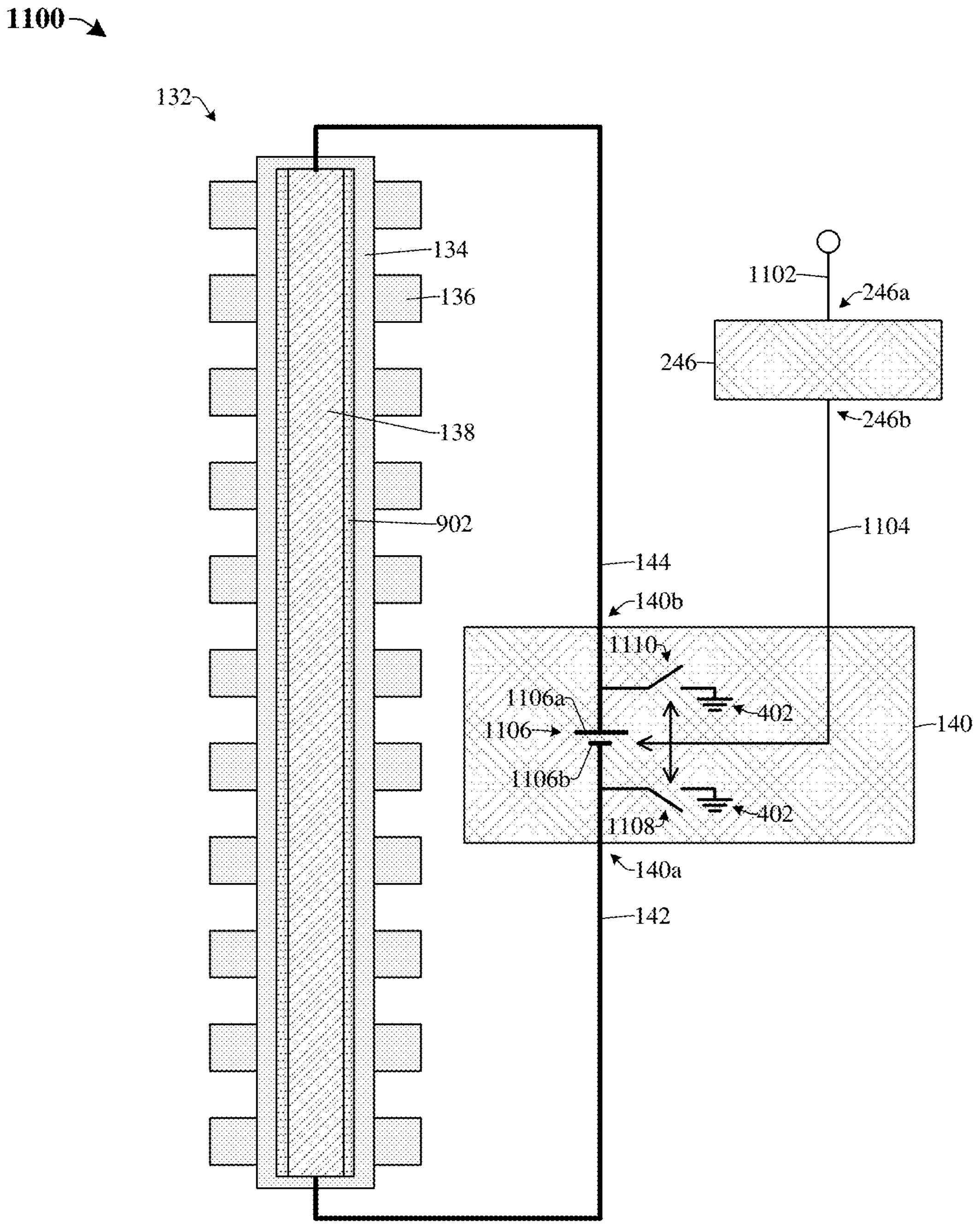
FIG. 11 illustrates a top view of some embodiments of the process tool of FIG. 9B in which the second controller is coupled to the second voltage supply.

FIG. 11 illustrates a top view 1100 of some embodiments of the process tool of FIG. 9B in which the second controller 246 is coupled to the second voltage supply 140.

In some embodiments, the second controller 246 has an input 246*a* coupled to a second input terminal 1102 and an output 246*b* coupled to a second control terminal 1104. In some embodiments, the second voltage supply 140 includes a second voltage source 1106 (e.g., a second DC voltage source) having a positive terminal 1106*a* and a negative terminal 1106*b*. The positive terminal 1106*a* is coupled to the second terminal 140*b* of the second voltage supply 140 and the negative terminal 1106*b* is coupled to the first terminal 140*a* of the second voltage supply 140. In some embodiments, the second voltage supply 140 further includes a first switch 1108 and a second switch 1110. The first switch 1108 selectively couples the negative terminal 1106*b* to ground 402. The second switch 1110 selectively couples the positive terminal 1106*a* to ground 402.

In some embodiments, the second voltage source 1106, the first switch 1108, and the second switch 1110 are controlled by the second control terminal 1104 of the second controller 246. For example, the second control terminal 1104 may include a first wire (not shown) coupled to a control terminal (not shown) of the second voltage source 1106 and a second wire (not shown) coupled to both a control terminal (not shown) of the first switch 1108 and a control terminal (not shown) of the second switch 1110. The second controller 246 is configured to control the voltage (e.g., voltage magnitude or level) across the second voltage source 1106, the state (e.g., ON or OFF) of the first switch 1108, and the state of the second switch 1110 via the second control terminal 1104. For example, the second controller 246 may set the voltage across the second voltage source 1106 to some voltage within a range from about 0.5 to 100 volts or some other suitable range. Further, to positively charge the second conductive rod 138, the second controller 246 may close (e.g., turn ON) the first switch 1108 and open (e.g., turn OFF) the second switch 1110, thereby coupling the negative terminal 1106*b* to ground 402 (e.g., as shown in FIG. 10A). Conversely, to negatively charge the second conductive rod 138, the second controller 246 may open (e.g., turn OFF) the first switch 1108 and close (e.g., turn ON) the second switch 1110, thereby coupling the positive terminal 1106*a* to ground 402 (e.g., as shown in FIG. 4B).

The second controller 246 may set the voltage of the second voltage source 1106 and the switching of the first and second switches 1108, 1110 based on a signal at the second input terminal 1102 (e.g., a user input signal, an automated input signal, or the like). For example, if a slurry having negatively charged abrasive particles is used during the polishing, that information may be provided to the second controller 246 via the second input terminal 1102. The second controller 246 can then control the voltage of the second voltage source 1106 and the switching of the first and second switches 1108, 1110 so the second conductive rod 138 is positively charged to remove the negatively charged abrasive particles during the second cleaning process.

Figure 12A:
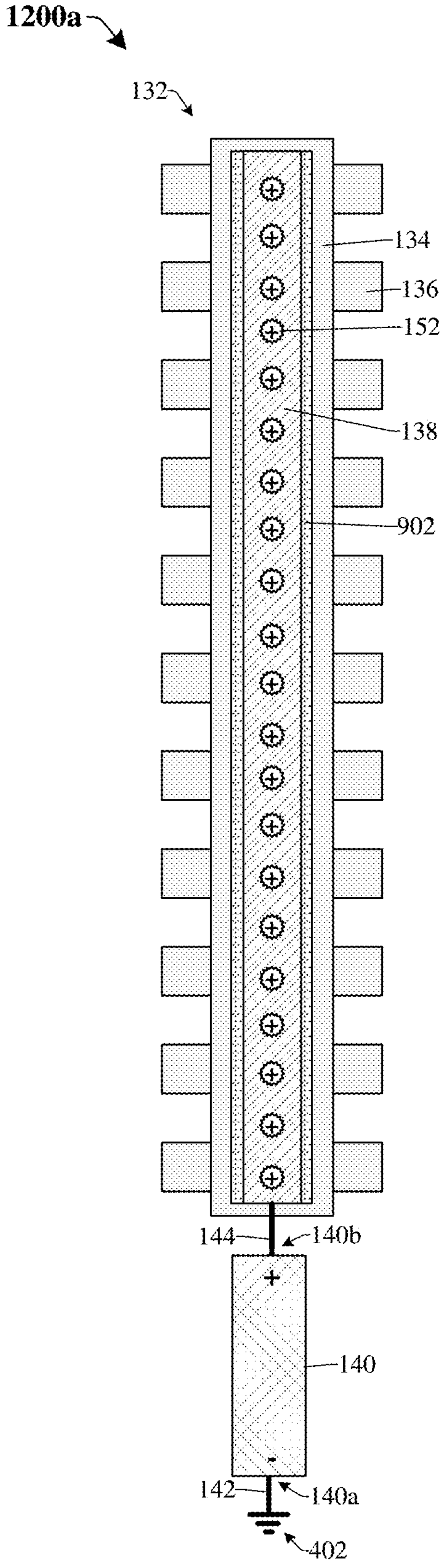
FIG. 12A illustrates a top view of some other embodiments of the process tool of FIG. 9B in which the second conductive rod is positively charged.

FIG. 12A illustrates a top view 1200*a* of some other embodiments of the process tool of FIG. 9B in which the second conductive rod 138 is positively charged.

In some embodiments, the first terminal 140*a* of the second voltage supply 140 is the negative terminal of the second voltage supply 140 and the second terminal 140*b* of the second voltage supply 140 is the positive terminal of the second voltage supply 140. The first terminal 140*a* is coupled to ground 402 and the second terminal 140*b* is coupled to the second conductive rod 138. Thus, the second conductive rod 138 may be positively charged (e.g., relative to ground 402). For example, the voltage across the second voltage supply 140 may be set to a first positive voltage (e.g., approximately 5 volts or some other suitable value). Thus, the voltage at the second terminal 140*b* is approximately equal to the first positive voltage (e.g., 5 volts) and the voltage at the first terminal 140*a* is approximately zero volts because the first terminal 140*a* is coupled to ground 402. As a result, the voltage at the second conductive rod 138 is positive (e.g., approximately 5 volts) and hence the second conductive rod 138 is positively charged.

Figure 12B:
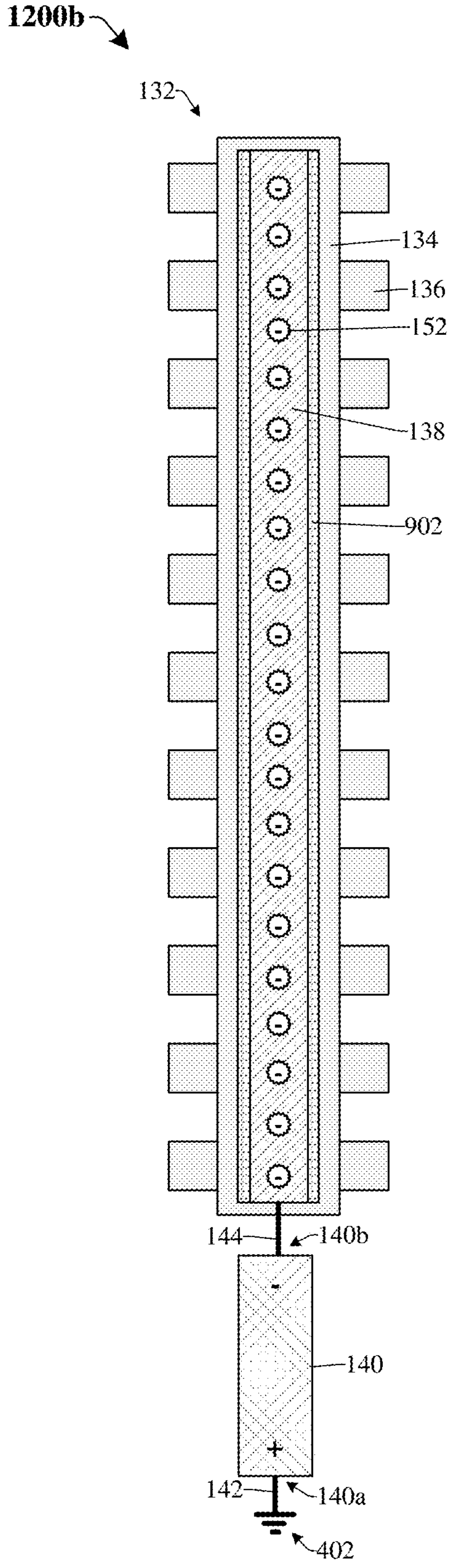
FIG. 12B illustrates a top view of some other embodiments of the process tool of FIG. 9B in which the second conductive rod is negatively charged.

FIG. 12B illustrates a top view 1200*b* of some other embodiments of the process tool of FIG. 9B in which the second conductive rod 138 is negatively charged.

In some embodiments, the first terminal 140*a* of the second voltage supply 140 is the positive terminal of the second voltage supply 140 and the second terminal 140*b* of the second voltage supply 140 is the negative terminal of the second voltage supply 140. Thus, the second conductive rod 138 may be negatively charged (e.g., relative to ground 402). For example, the voltage across the second voltage supply 140 may be set to the first positive voltage (e.g., approximately 5 volts or some other suitable value). Thus, the voltage at the second terminal 140*b* is approximately equal to the negation of the first positive voltage (e.g., −5 volts) and the voltage at the first terminal 140*a* is approximately zero volts because the first terminal 140*a* is coupled to ground 402. As a result, the voltage at the second conductive rod 138 is negative (e.g., approximately −5 volts) and hence the second conductive rod 138 is negatively charged.

Figure 13:
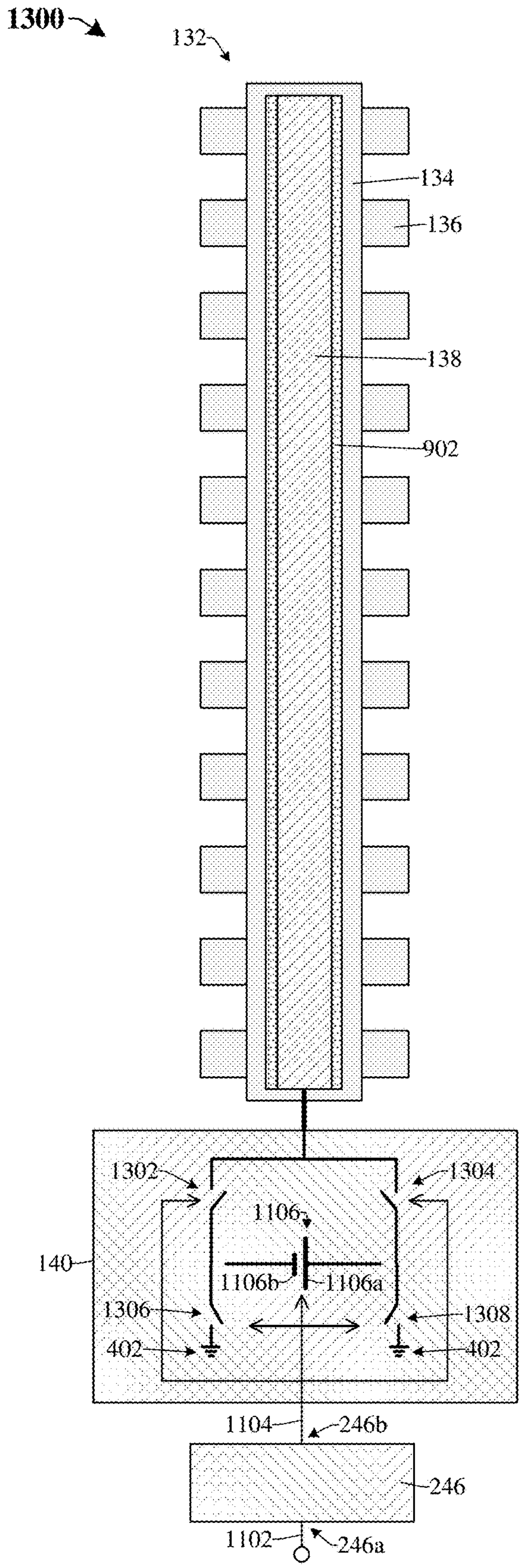
FIG. 13 illustrates a top view of some other embodiments of the process tool of FIG. 9B in which the second controller is coupled to the second voltage supply.

FIG. 13 illustrates a top view 1300 of some other embodiments of the process tool of FIG. 9B in which the second controller 246 is coupled to the second voltage supply 140.

In some embodiments, the second terminal 140*b* is coupled to the second conductive rod 138. In some embodiments, the second voltage supply 140 includes a first switch 1302, a second switch 1304, a third switch 1306, and a fourth switch 1308. The first switch 1302 selectively couples the negative terminal 1106*b* of the second voltage source 1106 to the second conductive rod 138 (e.g., via the second terminal 140*b*). The second switch 1304 selectively couples the positive terminal 1106*a* of the second voltage source 1106 to the second conductive rod 138. The third switch 1306 selectively couples the negative terminal 1106*b* to ground 402. The fourth switch 1308 selectively couples the positive terminal 1106*a* to ground 402.

In some embodiments, the second voltage source 1106, the first switch 1302, the second switch 1304, the third switch 1306, and the fourth switch 1308 are controlled by the second control terminal 1104 of the second controller 246. For example, the second control terminal 1104 may include a first wire (not shown) coupled to a control terminal (not shown) of the second voltage source 1106. Further, the second control terminal 1104 may include a second wire (not shown) coupled to a control terminal (not shown) of the first switch 1302, a control terminal (not shown) of the second switch 1304, a control terminal (not shown) of the third switch 1306, and a control terminal (not shown) of the fourth switch 1308. The second controller 246 is configured to control the voltage (e.g., voltage magnitude or level) across the second voltage source 1106 and the states (e.g., ON or OFF) of the switches 1302, 1304, 1306, 1308 via the second control terminal 1104 to control the charge of the second conductive rod 138 (e.g., similar to how the first controller 224 controls the charge of the first conductive rod 120 in the embodiments illustrated in FIG. 8). In some embodiments, any of the switches described herein may, for example, be or comprise transistor devices (e.g., bipolar junction transistors, metal-oxide-semiconductor field affect transistors, junction field effect transistors, or the like) or some other suitable devices.

Figure 14A:
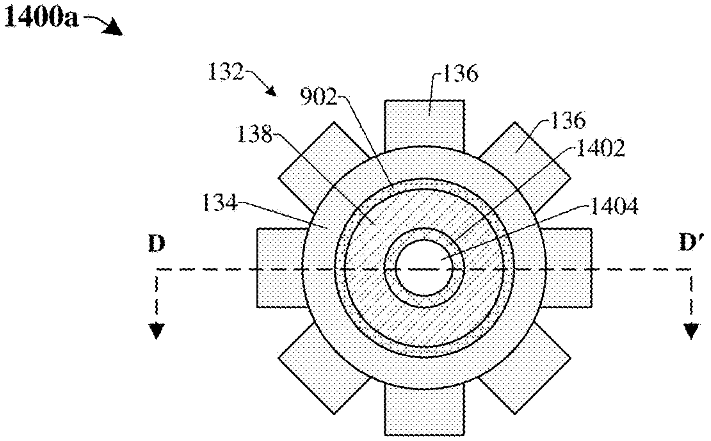
FIG. 14A, FIG. 14B, and FIG. 14C illustrate cross-sectional views of some embodiments of the process tool of FIG. 9A and FIG. 9B in which a tube having a cavity therein is disposed within the second conductive rod.
Figure 14B:
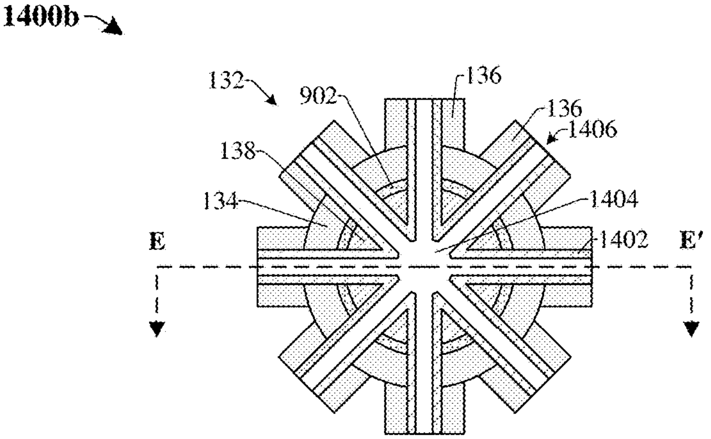
Figure 14C:
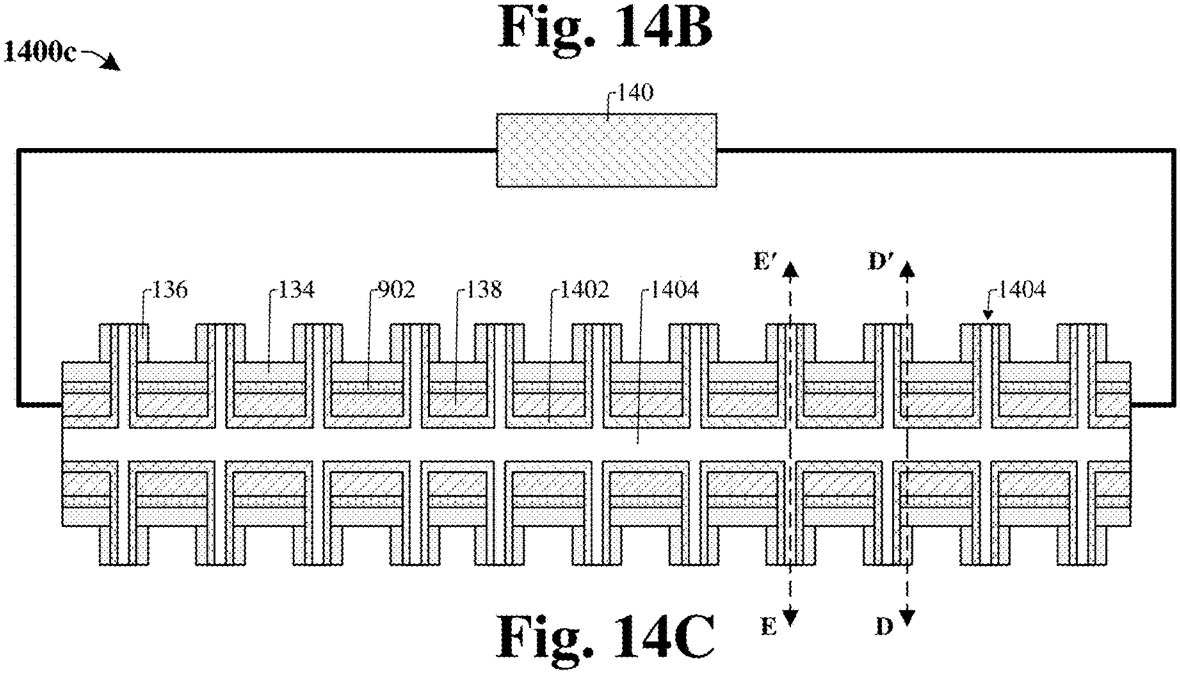

FIG. 14A, FIG. 14B, and FIG. 14C illustrate cross-sectional views 1400*a*, 1400*b*, 1400*c*, respectively, of some embodiments of the process tool of FIG. 9A and FIG. 9B in which a tube 1402 having a cavity 1404 therein is disposed within the second conductive rod 138. In some embodiments, cross-sectional view 1400*a* of FIG. 14A may, for example, be taken across line D-D' of FIG. 14C and/or cross-sectional view 1400*c* of FIG. 14C may be taken across line D-D' of FIG. 14A. In some embodiments, cross-sectional view 1400*b* of FIG. 14B may, for example, be taken across line E-E' of FIG. 14C and/or cross-sectional view 1400*c* of FIG. 14C may be taken across line E-E' of FIG. 14B.

In some embodiments, the tube 1402 extends along the length of the second conductive rod 138. The second conductive rod 138 surrounds portions of the tube 1402. The tube 1402 may be configured to convey the second cleaning fluid along the first wafer brush 132. For example, the cleaning fluid may be injected into the tube 1402 (e.g., into the cavity 1404 within the tube 1402). The tube 1402 may have a plurality of openings 1406 along the first wafer brush 132 at the protrusions 136 of the first wafer brush 132. The openings 1406 extend through openings in the second conductive rod 138. The openings 1406 establish fluid communication between the cavity 1404 within the tube 1402 and an environment outside of the first wafer brush 132. Thus, the second cleaning fluid may be dispensed via the openings in the tube 1402 during the second cleaning process.

FIGS. 15A, 16A, 17A, 18A, 19A, 20A, 21A, 22A, 23A, 24A illustrate cross-sectional views 1500*a*, 1600*a*, 1700*a*, 1800*a*, 1900*a*, 2000*a*, 2100*a*, 2200*a*, 2300*a*, 2400*a*, respectively, and FIGS. 15B, 16B, 17B, 18B, 19B, 20B, 21B, 22B, 23B, 24B illustrate corresponding three-dimensional views 1500*b*, 1600*b*, 1700*b*, 1800*b*, 1900*b*, 2000*b*, 2100*b*, 2200*b*, 2300*b*, 2400*b*, respectively, of some embodiments of an method for polishing a wafer 102 and removing charged particles from the wafer 102 after the polishing. Although FIGS. 15A-24B are described in relation to a method, it will be appreciated that the structures disclosed in FIGS. 15A-24B are not limited to such a method, but instead may stand alone as structures independent of the method.

Figure 15A:
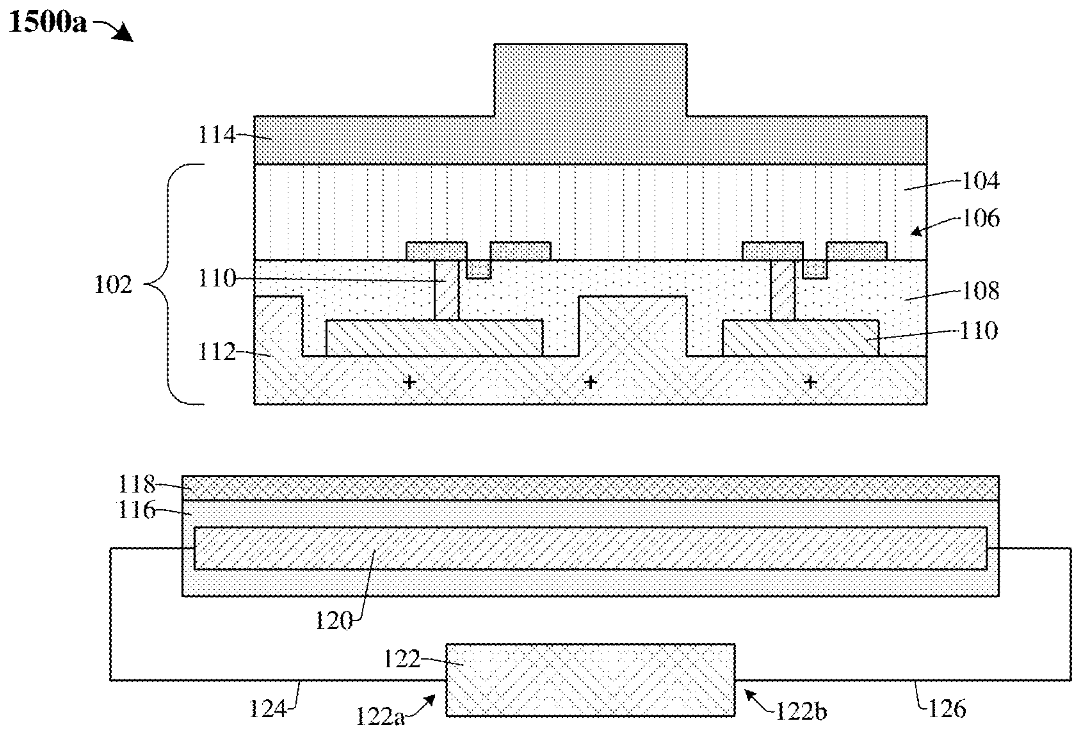
FIGS. 15A, 16A, 17A, 18A, 19A, 20A, 21A, 22A, 23A, 24A illustrate cross-sectional views
Figure 15B:
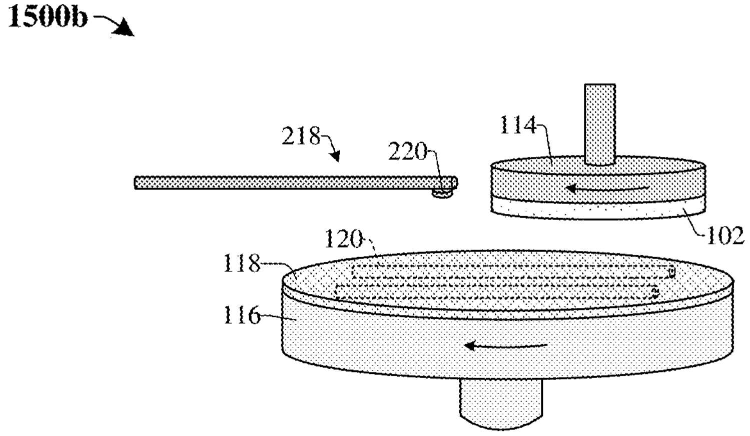
FIGS. 15B, 16B, 17B, 18B, 19B, 20B, 21B, 22B, 23B, 24B illustrate corresponding three-dimensional views of some embodiments of an method for polishing a wafer and removing charged particles from the wafer after the polishing.

As shown in cross-sectional view 1500*a* of FIG. 15A and corresponding three-dimensional view 1500*b* of FIG. 15B, the wafer 102 is attached to the wafer carrier 114 and positioned over the wafer platen 116 in the polishing chamber (e.g., 202 of FIG. 2). For example, in some embodiments, the wafer 102 is moved to the polishing chamber (e.g., 202 of FIG. 2) by the wafer transport robot (e.g., 210 of FIG. 2). The wafer 102 and the wafer platen 116 are then rotated. In some embodiments, the wafer 102 and the wafer platen 116 are rotated in different directions (e.g., the wafer 102 is rotated clockwise and the wafer platen 116 is rotated counter clockwise). In some other embodiments, the wafer 102 and the wafer platen 116 are rotated in the same direction.

Figure 16A:
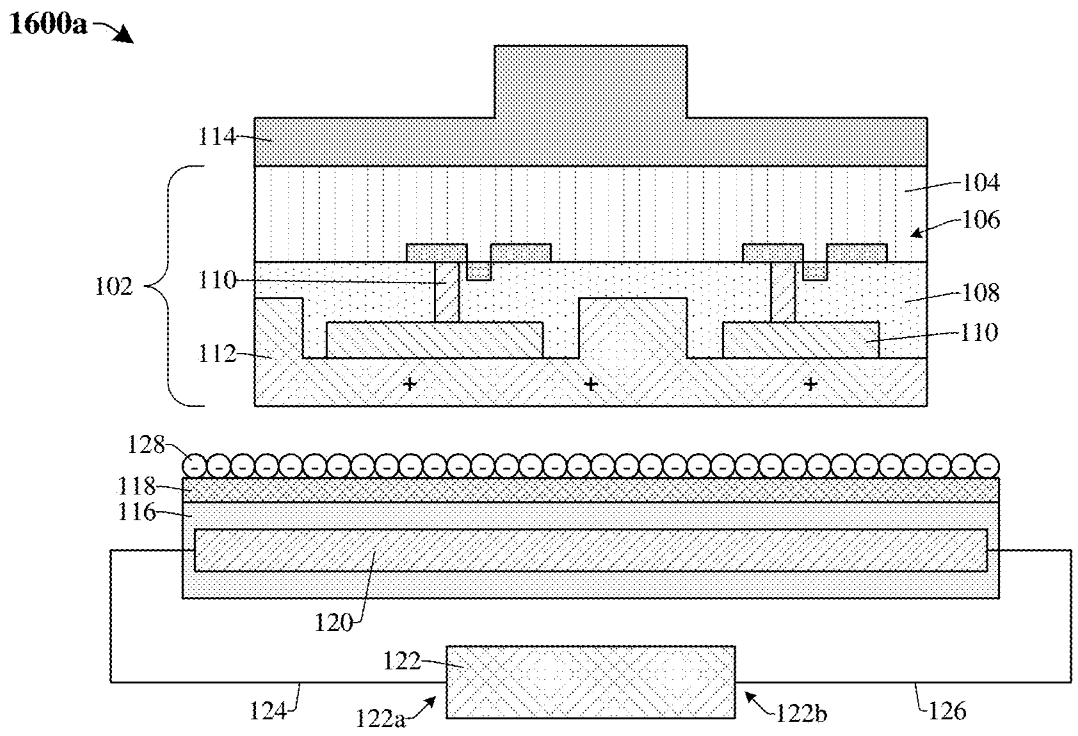
Figure 16B:
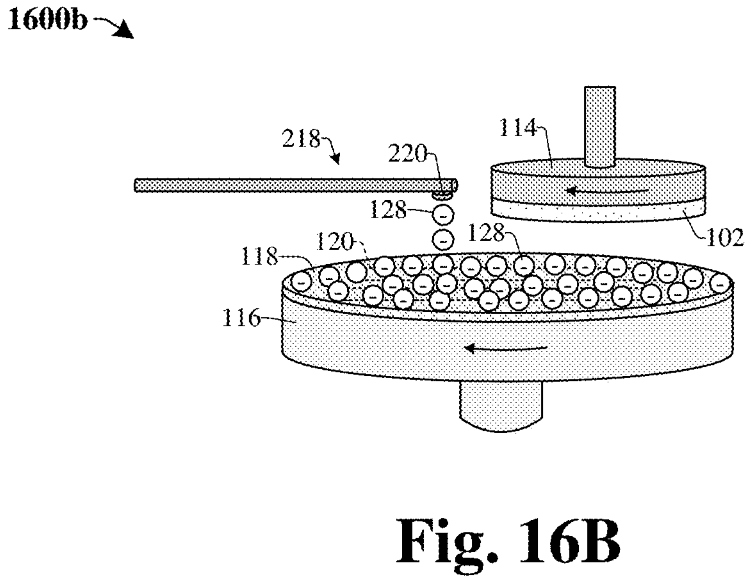

As shown in cross-sectional view 1600*a* of FIG. 16A and corresponding three-dimensional view 1600*b* of FIG. 16B, the abrasive slurry comprising the charged abrasive particles 128 is dispensed onto the polishing pad 118. For example, in some embodiments, the abrasive slurry is dispensed from the nozzle 220 of the slurry dispenser 218 onto the polishing pad 118. The charged abrasive particles 128 have a first polarity. For example, in some embodiments, the charged abrasive particles 128 are negatively charged.

Figure 17A:
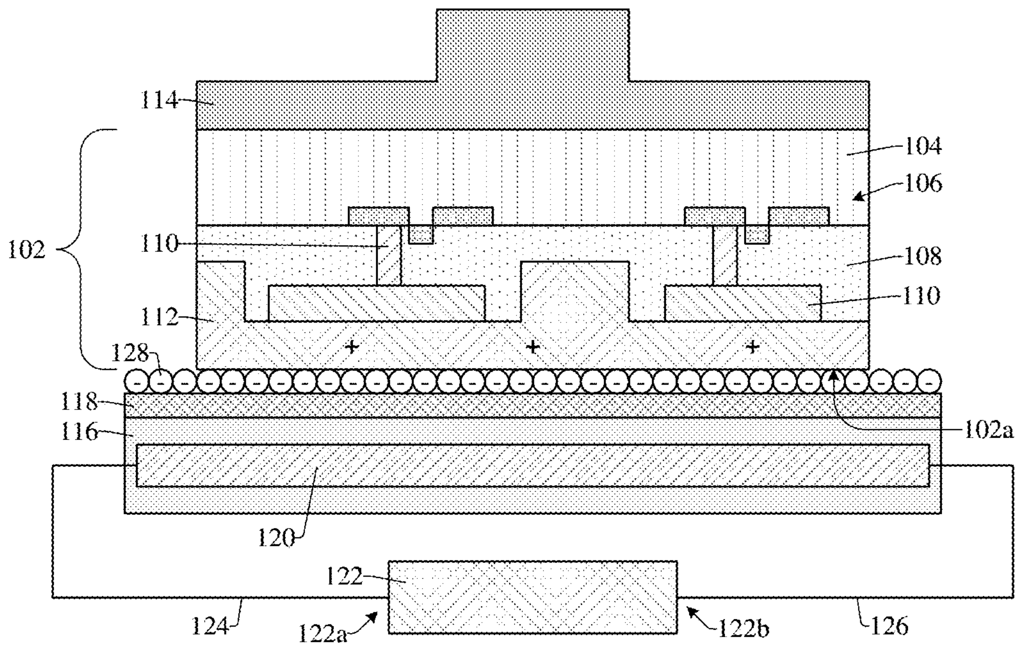
Figure 17B:
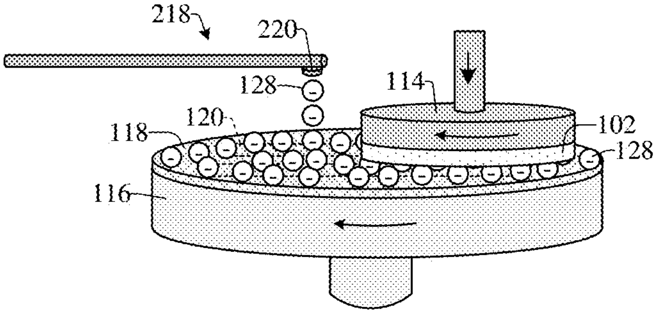

As shown in cross-sectional view 1700*a* of FIG. 17A and corresponding three-dimensional view 1700*b* of FIG. 17B, a first side 102*a* of the wafer 102 is brought into contact with both the polishing pad 118 and the charged abrasive particles 128 that are on the polishing pad 118 to polish the first side 102*a* of the wafer 102. For example, the second dielectric layer 112 of the wafer 102 is polished to thin (e.g., remove a portion of) the second dielectric layer 112. In some embodiments, a downward force is applied on the wafer 102 to cause abrasion between the wafer 102 and the polishing pad 118. The charged abrasive particles 128 of the abrasive slurry may aid in the polishing of the wafer 102 by increasing an abrasion between the wafer 102 and the polishing pad 118. The polishing of the wafer 102 may be performed for a predetermined amount of time or until the desired amount of the wafer 102 (e.g., the desired amount of the second dielectric layer 112) is polished.

Figure 18A:
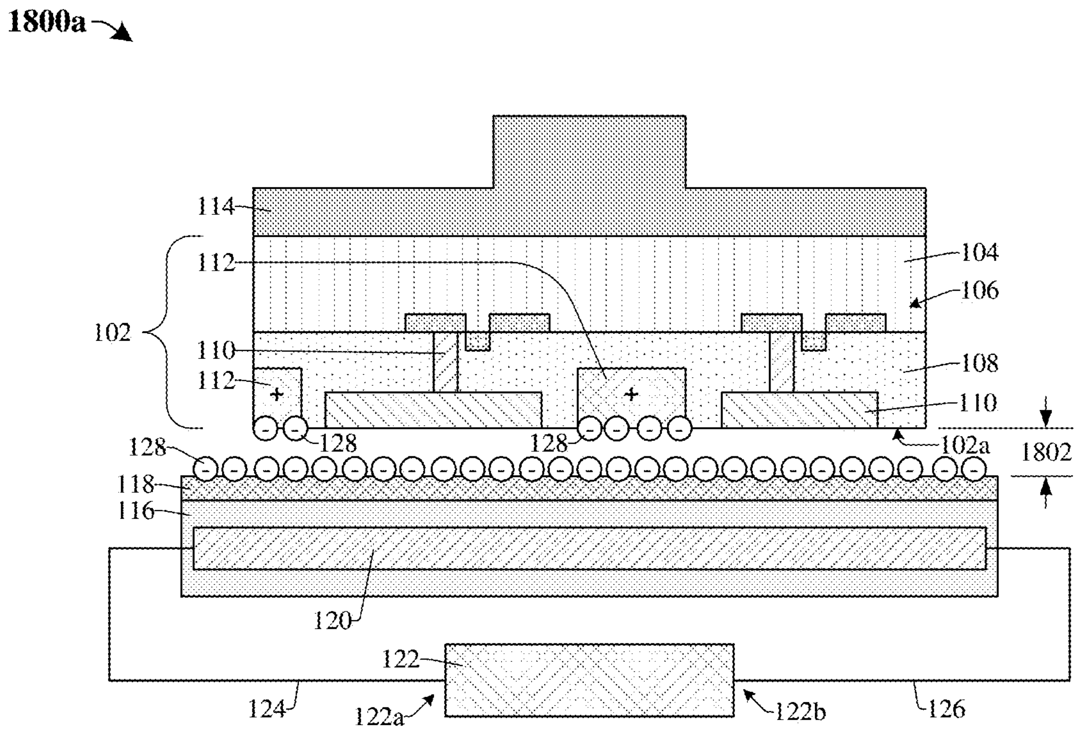
Figure 18B:
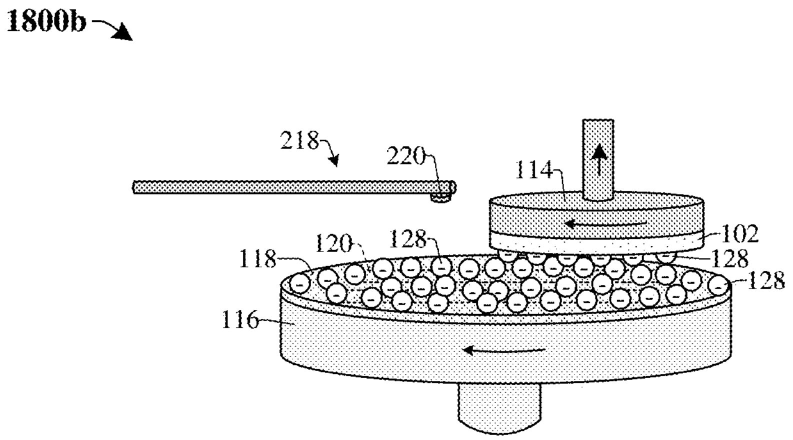

As shown in cross-sectional view 1800*a* of FIG. 18A and corresponding three-dimensional view 1800*b* of FIG. 18B, the dispensing of the abrasive slurry is stopped and the wafer 102 is lifted a first distance 1802 away from the polishing pad 118. In some instances, an electrostatic force may exist between the charged abrasive particles 128 and the wafer 102. For example, the second dielectric layer 112 (or some other layer of the wafer 102) may have a second polarity, opposite the first polarity. Thus, the charged abrasive particles 128 may be attracted to the second dielectric layer 112 due to the electrostatic force. As a result, the charged abrasive particles 128 may collect along the first side 102*a* of the wafer 102 after and/or during the polishing.

In some embodiments, the polishing process may result in the wafer 102 having substantially planar surface or surfaces. Thus, in some instances, the polishing process may alternatively be referred to as a planarization process.

Figure 19A:
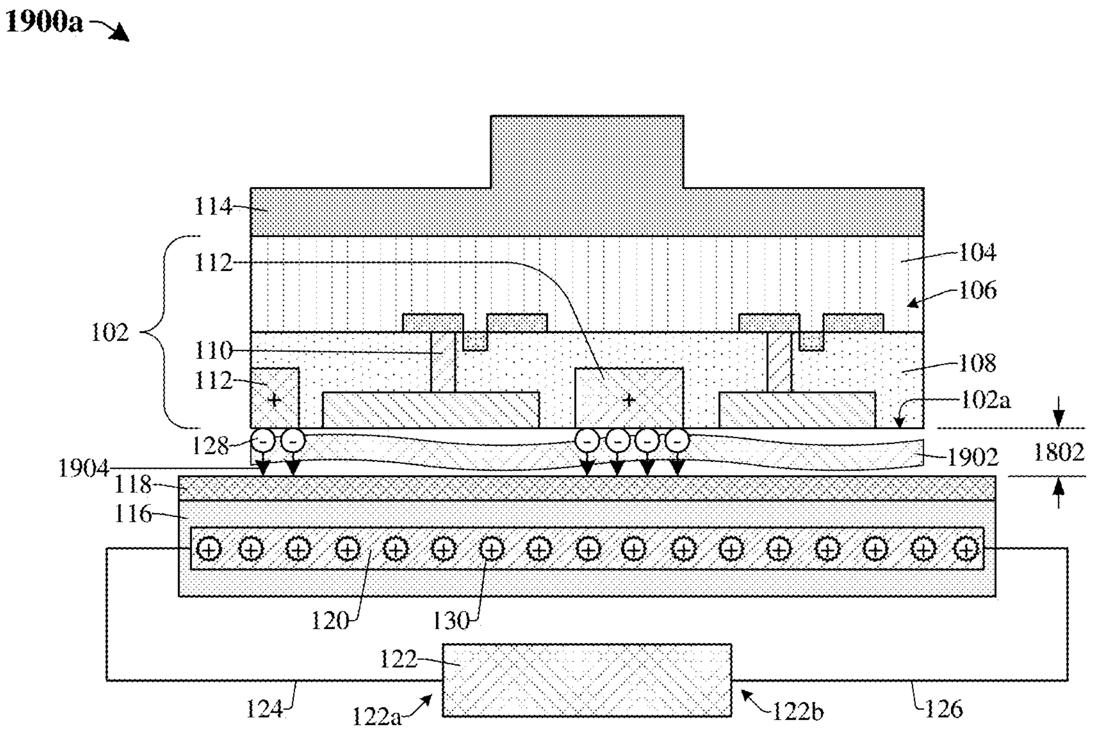
Figure 19B:
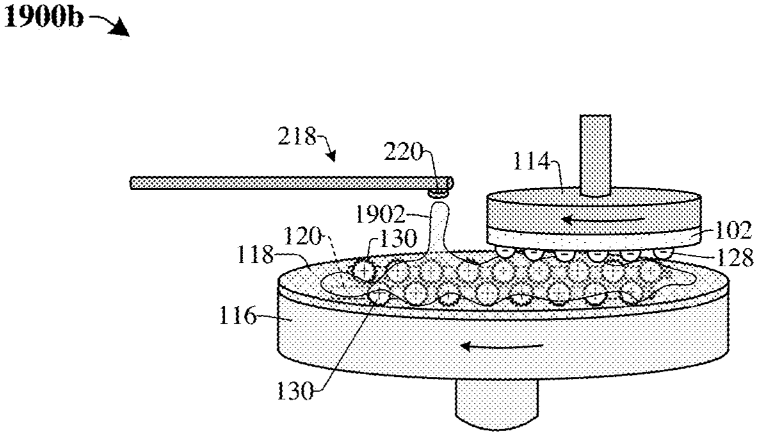

As shown in cross-sectional view 1900*a* of FIG. 19A and corresponding three-dimensional view 1900*b* of FIG. 19B, a first cleaning fluid 1902 is dispensed onto the polishing pad 118 and a first charge having a second polarity, opposite the first polarity, is applied to the first conductive rod(s) 120 while the wafer 102 is the first distance 1802 from the polishing pad 118. This may be referred to as a first wafer cleaning process. For example, the first cleaning fluid 1902 is dispensed from the nozzle 220 of the slurry dispenser 218 onto the polishing pad 118. In some embodiments, the first cleaning fluid 1902 is in contact with both the polishing pad 118 and the wafer 102. In some embodiments, the first distance 1802 is substantially small so that the first cleaning fluid 1902 can contact both the polishing pad and the wafer 102. For example, in some embodiments, the first distance 1802 ranges from about 0.5 millimeters to about 1.5 millimeters or some other suitable range. In some embodiments, the first cleaning fluid 1902 may, for example, comprise deionized (DI) water, some chemical cleaning fluid, or some other suitable cleaning fluid.

In some embodiments, the first charge is applied to the first conductive rod(s) 120 by applying a first voltage to the first conductive rod(s) 120. In some embodiments, the first voltage is applied to the first conductive rod(s) 120 by the first voltage supply 122 (e.g., as illustrated in FIGS. 4A, 4B, 5, or FIGS. 7A, 7B, 8). For example, the first controller (e.g., 224 of FIGS. 2, 5, 8) controls the first voltage supply 122 to control the first charge applied to the first conductive rod(s) 120. The polarity of the first charge is set to be opposite the polarity of the charged abrasive particles 128 to create an attractive electrostatic force between the charged abrasive particles 128 and the first conductive rod(s) 120. The charged abrasive particles 128 are attracted to the first conductive rod(s) 120 due to the attractive electrostatic force and thus the charged abrasive particles 128 can be pulled away from the wafer 102 and onto the polishing pad 118, as illustrated by arrows 1904. As a result, a likelihood of charged abrasive particles 128 remaining on the wafer 102 after the first cleaning process may be reduced and hence a likelihood of defects forming along the wafer 102 may be reduced.

Figure 20A:
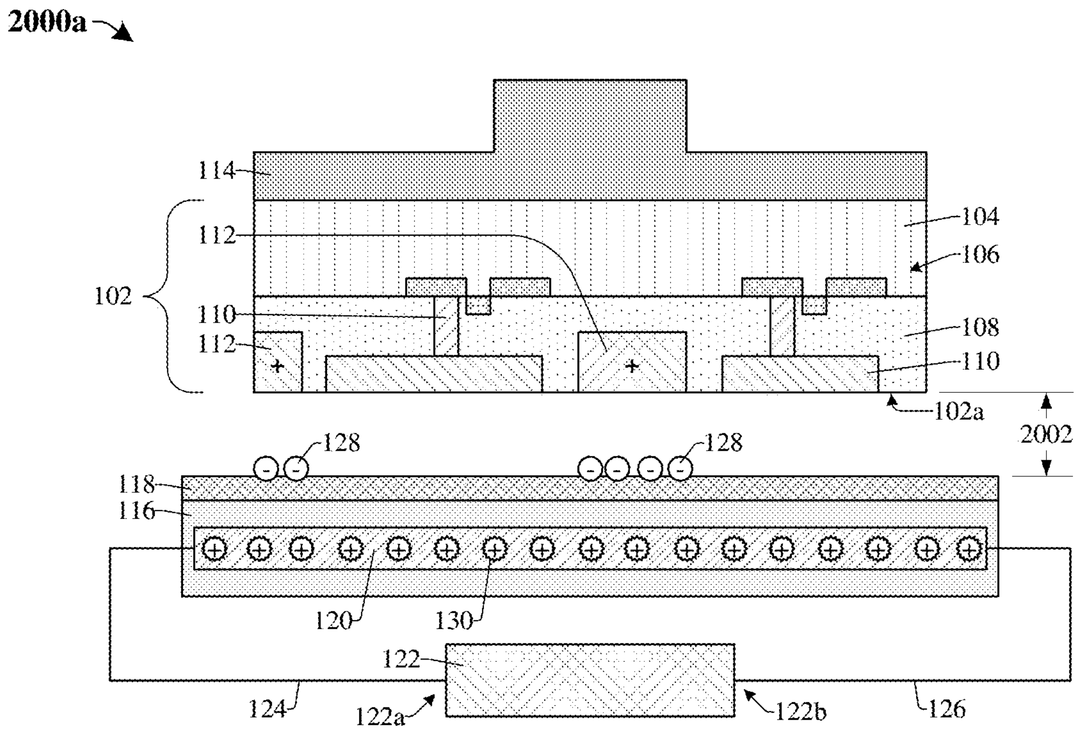
Figure 20B:
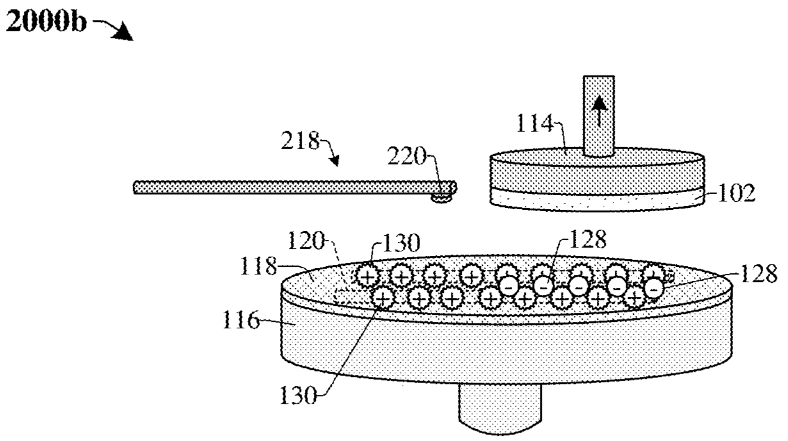

As shown in cross-sectional view 2000*a* of FIG. 20A and corresponding three-dimensional view 2000*b* of FIG. 20B, the dispensing of the first cleaning fluid (e.g., 1902 of FIGS. 19A, 19B) is stopped, the rotation of the wafer 102 and the wafer platen 116 is stopped, and the wafer 102 is lifted further away from the polishing pad 118 while the first charge is applied to the first conductive rod(s) 120. For example, the wafer 102 is moved a second distance 2002 away from the polishing pad 118, the second distance being substantially greater than the first distance (e.g., 1802 of FIG. 18A).

After the wafer 102 is moved further away from the polishing pad 118, the first charge can be removed from the first conductive rod(s) 120. For example, the first voltage supply 122 can be turned off, thereby removing the first voltage and first charge from the first conductive rod(s) 120. Because the wafer 102 is substantially further away from the polishing pad 118 and the charged abrasive particles 128 that are disposed on the polishing pad 118 when the first charge is removed from the first conductive rod(s) 120, the charged abrasive particles 128 may remain on the polishing pad 118. For example, because the distance between the wafer 102 and the charged abrasive particles 128 on the polishing pad 118 is substantially increased, the attractive electrostatic force between the charged abrasive particles 128 and the second dielectric layer 112 may be substantially reduced. Thus, a likelihood of the charged abrasive particles 128 being pulled back to the wafer 102 after the first charge is removed from the first conductive rod(s) 120 is substantially reduced. In some embodiments, the second distance 2002 may, for example, be about 10 times greater than the first distance, about 100 times greater than the first distance, or some other suitable value.

In some embodiments, the polishing pad 118 is cleaned after the first wafer cleaning process to remove the charged abrasive particles 128 from the polishing pad 118. For example, the pad conditioner (e.g., 214 of FIG. 2) may be applied to the polishing pad 118 to clean the polishing pad 118 of the remaining charged abrasive particles 128.

In some embodiments, the wafer 102 is moved from the polishing chamber to the mega-sonic module (e.g., 204 of FIG. 2) by the wafer transport robot (e.g., 210 of FIG. 2). The wafer is then processed in the mega-sonic chamber. Next, the wafer 102 is moved from the mega-sonic chamber to the brushing module (e.g., 206 of FIG. 2) by the wafer transport robot. In some embodiments, the wafer 102 placed on the wafer roller(s) (e.g., 156 of FIG. 1B, 21A, 21B) in the brushing module and between the first wafer brush 132 and the second wafer brush 248.

Figure 21A:
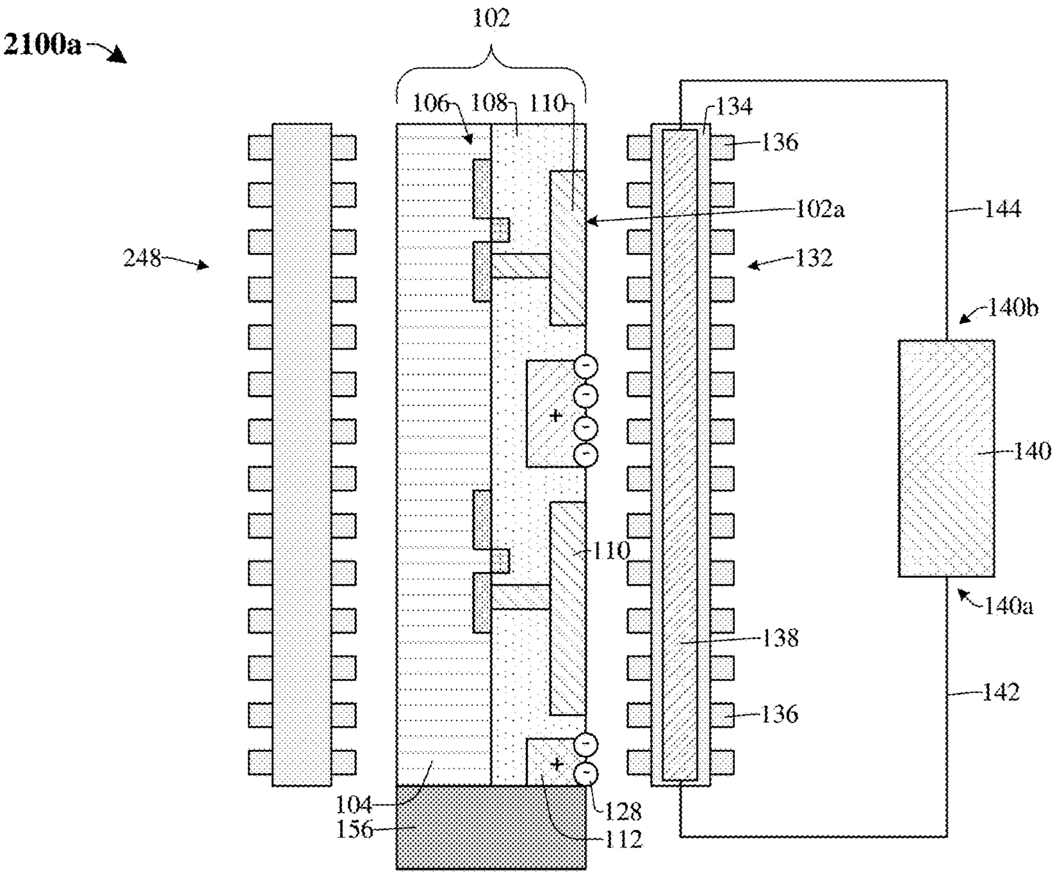
Figure 21B:
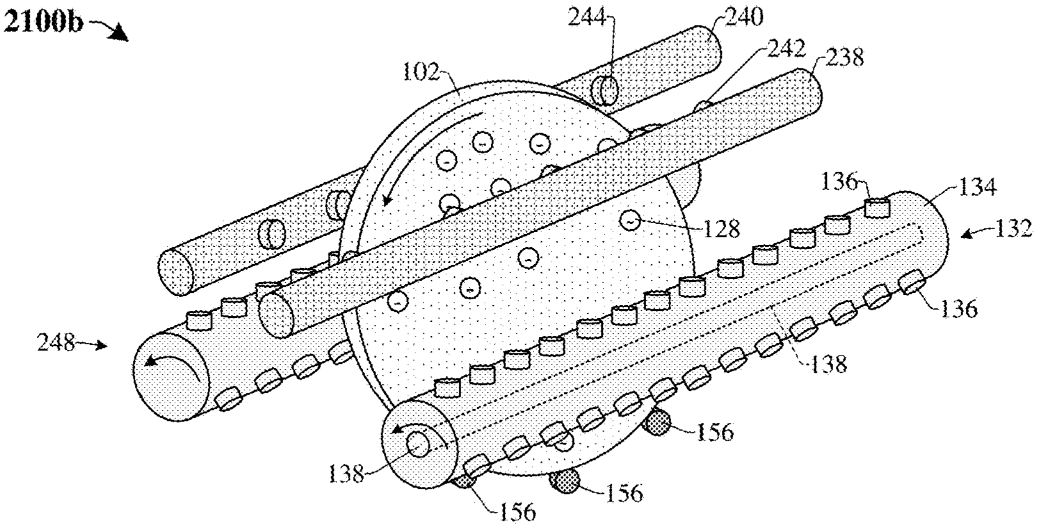

As shown in cross-sectional view 2100*a* of FIG. 21A and corresponding three-dimensional view 2100*b* of FIG. 21B, the wafer 102 is rotated by the wafer roller(s) 156. In some embodiments, the first and second wafer brushes 132, 248 are also rotated (e.g., in a same or different direction than the wafer 102).

Figure 22A:
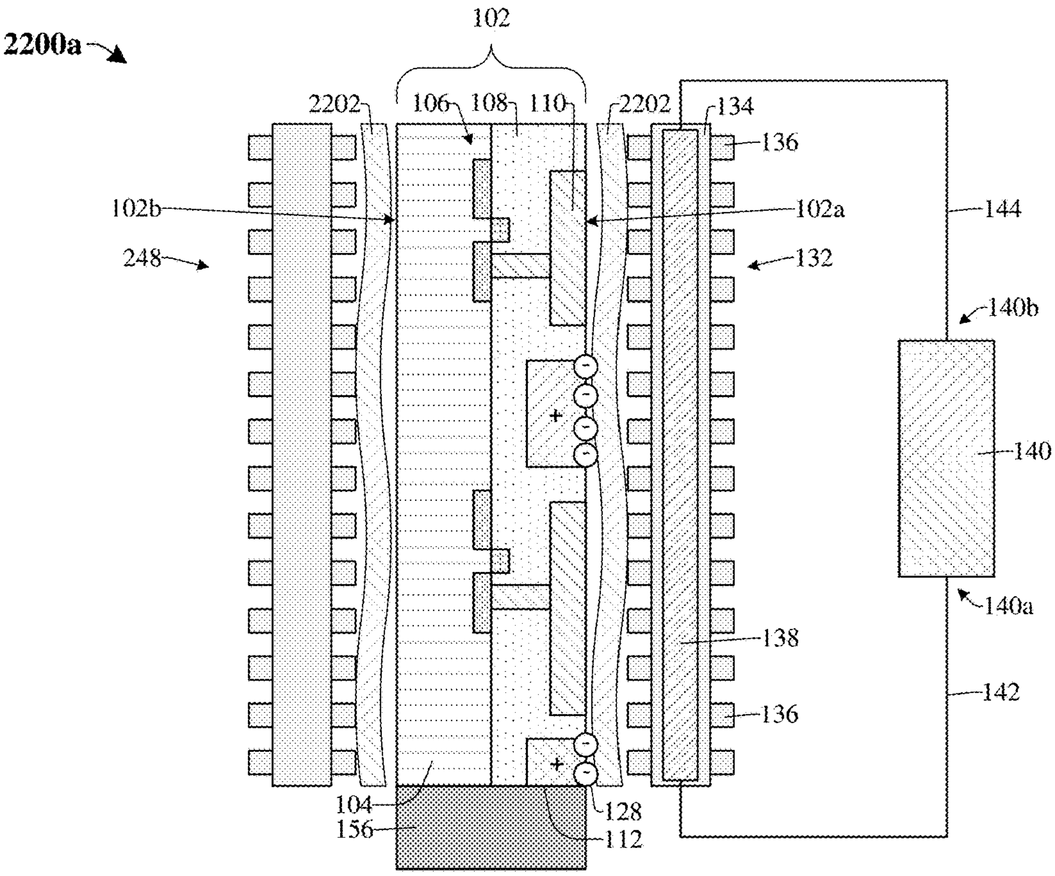
Figure 22B:
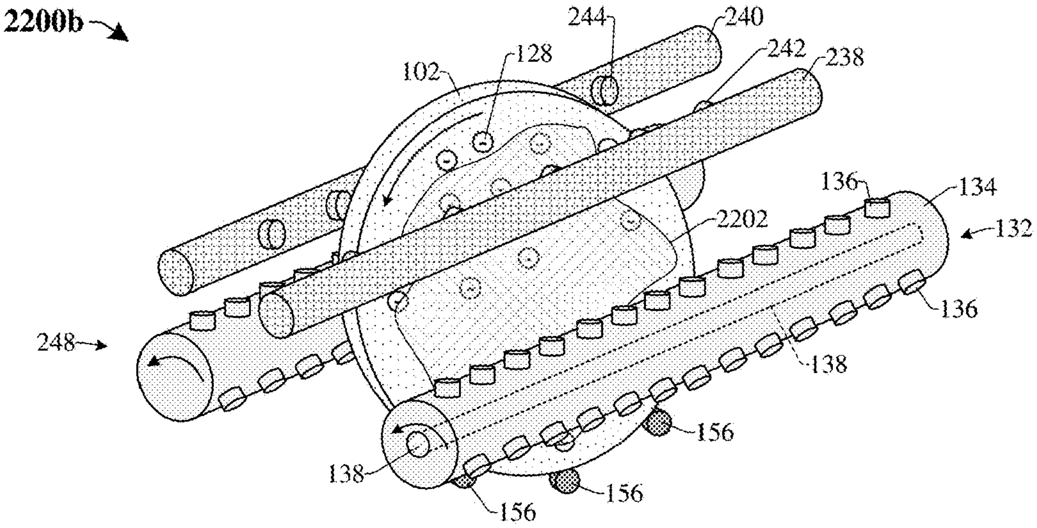

As shown in cross-sectional view 2200*a* of FIG. 22A and corresponding three-dimensional view 2200*b* of FIG. 22B, the second cleaning fluid 2202 is dispensed onto the wafer 102. For example, in some embodiments, the second cleaning fluid 2202 is dispensed from the first nozzles 242 of the first spray bar 238 onto the first side 102*a* of the wafer 102 and from the second nozzles 244 of the second spray bar 240 onto a second side 102*b* of the wafer 102, opposite the first side 102*a*. In some embodiments, the second cleaning fluid 2202 may, for example, comprise DI water, some chemical cleaning fluid, or some other suitable cleaning fluid.

In some embodiments, the second cleaning fluid 2202 is additionally or alternatively dispensed from the first wafer brush 132. For example, a tube (e.g., 1402 of FIG. 14A, 14B, 14C) may be disposed within the first wafer brush 132 (e.g., as illustrated in FIGS. 14A, 14B, 14C). The second cleaning fluid 2202 may be dispensed onto the wafer 102 from the tube through openings (e.g., 1406 of FIGS. 14B, 14C) along the first wafer brush 132.

Figure 23A:
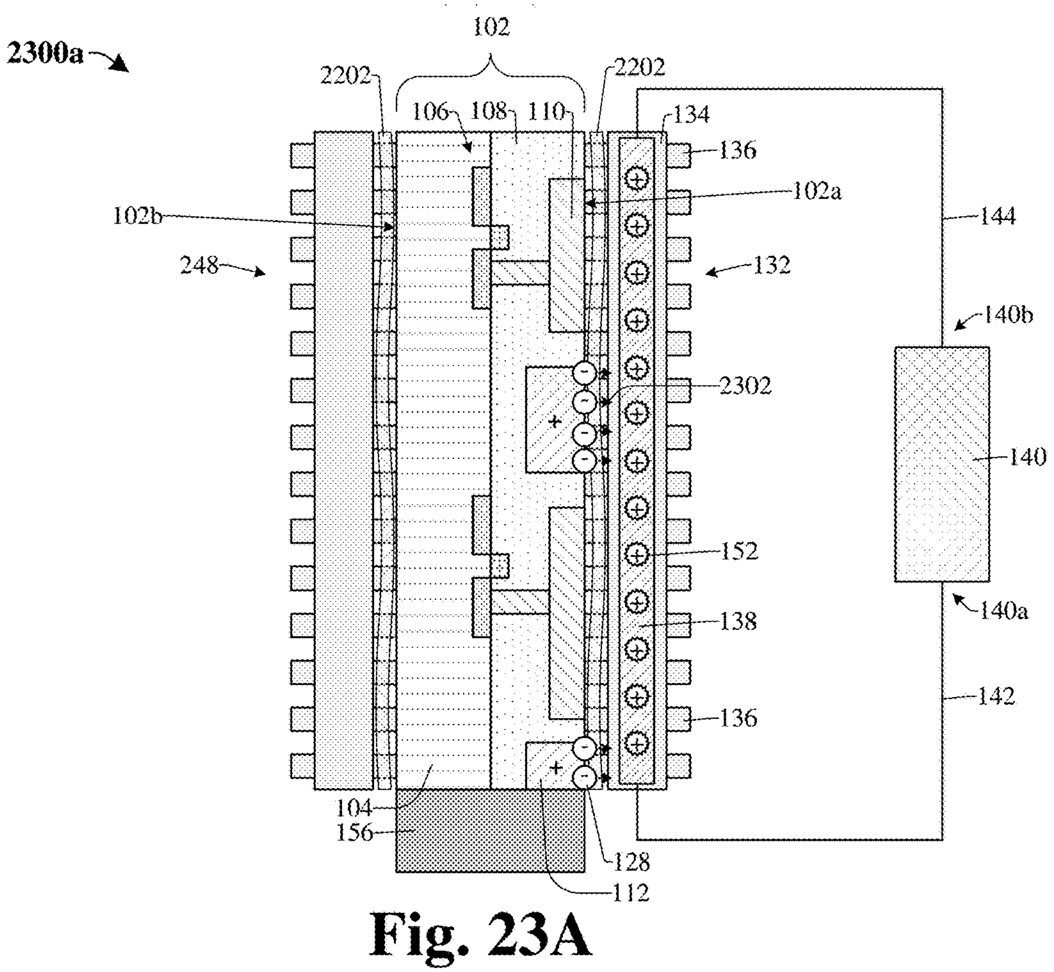
Figure 23B:
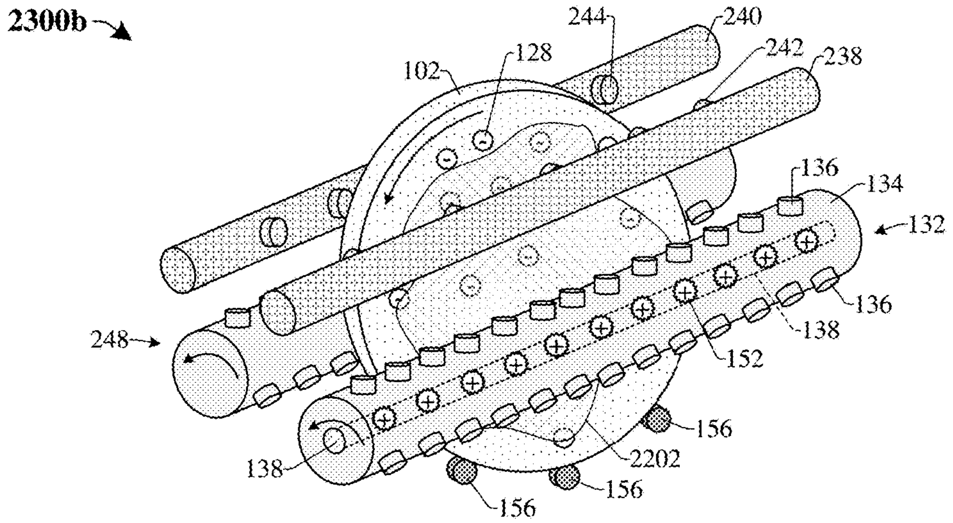

As shown in cross-sectional view 2300*a* of FIG. 23A and corresponding three-dimensional view 2300*b* of FIG. 23B, a second charge having the second polarity is applied to the second conductive rod 138 and the first and second wafer brushes 132, 248 are moved into contact with the wafer 102 to further clean the wafer 102. This may be referred to as a second cleaning process. In some embodiments, the first wafer brush 132 is moved into contact with the first side 102*a* of the wafer 102 and the second wafer brush 248 is moved into contact with the second side 102*b* of the wafer 102. In some embodiments, the first and second wafer brushes 132, 248 contact both the wafer 102 and the second cleaning fluid 2202.

In some embodiments, the second charge is applied to the second conductive rod 138 by applying a second voltage to the second conductive rod 138. In some embodiments, the second voltage is applied to the second conductive rod 138 by the second voltage supply 140 (e.g., as illustrated in FIGS. 10A, 10B, 11, or FIGS. 12A, 12B, 13). For example, the second controller (e.g., 246 of FIGS. 2, 11, 13) controls the second voltage supply 140 to control the second charge applied to the second conductive rod 138. The polarity of the second charge is set to be opposite the polarity of the charged abrasive particles 128 to create an attractive electrostatic force between charged abrasive particles 128 remaining on the wafer 102 and the second conductive rod 138. The charged abrasive particles 128 are attracted to the second conductive rod 138 due to the attractive electrostatic force and thus the charged abrasive particles 128 may be pulled away from the wafer 102 and onto the first wafer brush 132, as illustrated by arrows 2302. As a result, a likelihood of charged abrasive particles 128 remaining on the wafer 102 after the second cleaning process may be reduced and hence a likelihood of defects forming along the wafer 102 may be further reduced.

Figure 24A:
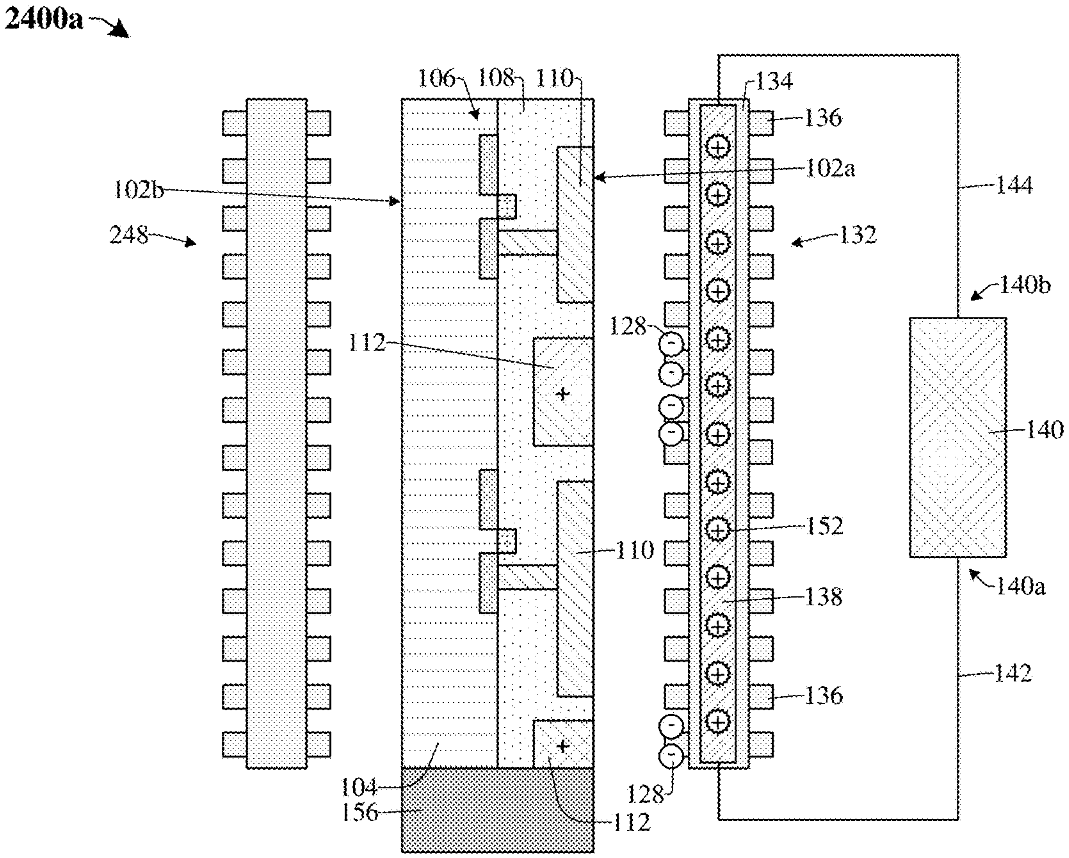
Figure 24B:
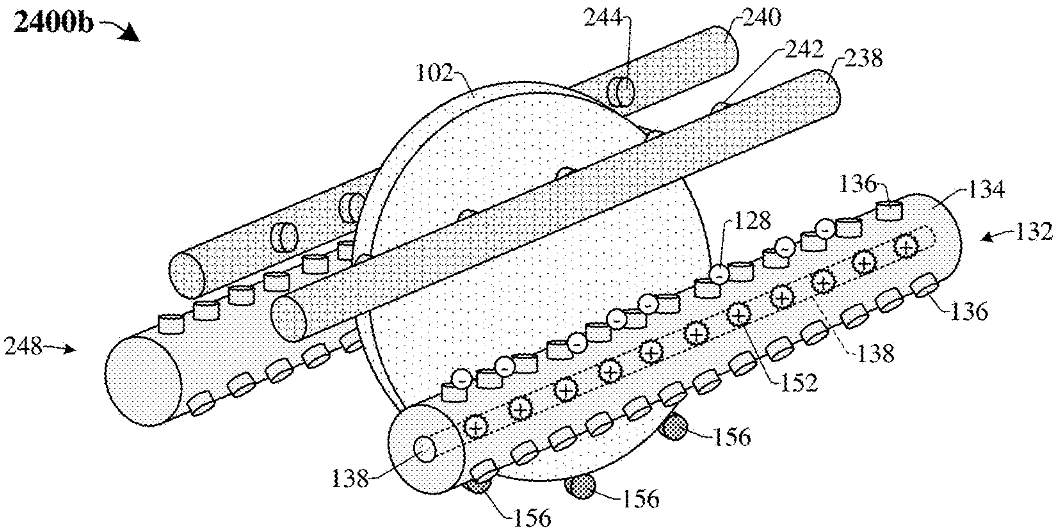

As shown in cross-sectional view 2400*a* of FIG. 24A and corresponding three-dimensional view 2400*b* of FIG. 24B, the first and second wafer brushes 132, 248 are moved away from the wafer 102 and the dispensing of the second cleaning fluid (e.g., 2202 of FIGS. 22A, 22B, 23A, 23B) onto the wafer 102 is stopped while the second charge is applied to the second conductive rod 138. The wafer and brush rotation may also be stopped.

After the first wafer brush 132 is moved substantially far away from the wafer 102, the second charge can be removed from the second conductive rod 138. For example, the second voltage supply 140 can be turned off, thereby removing the second voltage and hence the second charge from the second conductive rod 138. Because the wafer 102 is substantially far away from the first wafer brush 132 and the charged abrasive particles 128 that are disposed on the first wafer brush 132 when the second charge is removed from the second conductive rod 138, the charged abrasive particles 128 may remain on the first wafer brush 132. For example, because the distance between the wafer 102 and the charged abrasive particles 128 on the first wafer brush 132 is substantially large, the attractive electrostatic force between the charged abrasive particles 128 and the second dielectric layer 112 may be substantially reduced. Thus, a likelihood of the charged abrasive particles 128 being pulled back to the wafer 102 after the second charge is removed from the second conductive rod 138 is substantially reduced. In some embodiments, the first wafer brush 132 may, for example, be moved about 1 to 10 centimeters or some other suitable distance away from the wafer 102 before the second charge is removed from the second conductive rod 138.

In some embodiments, the first wafer brush 132 is cleaned after the second charge is removed from the second conductive rod 138 to remove the charged abrasive particles 128 from the first wafer brush 132.

Figure 25:
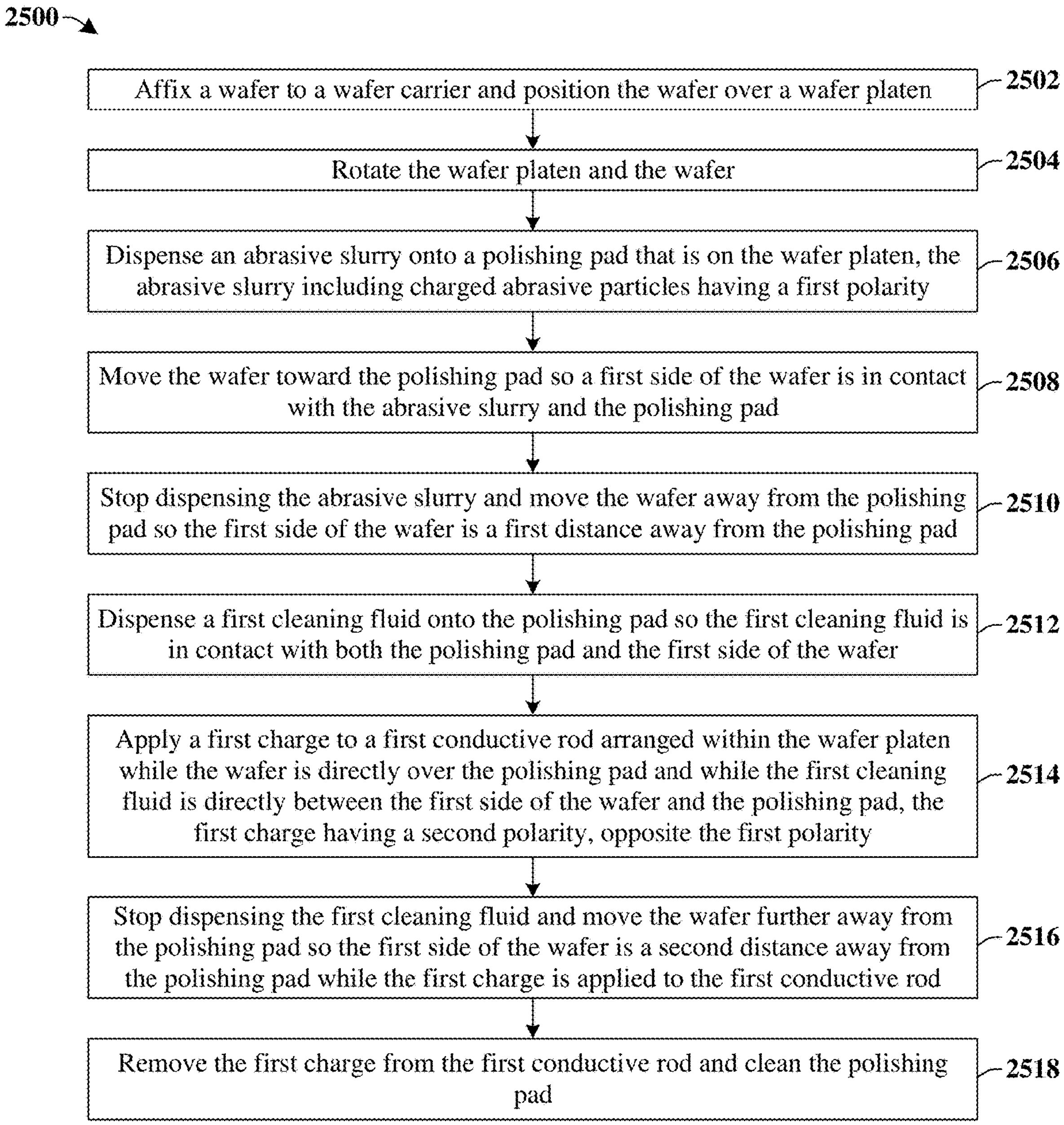
FIG. 25 illustrates a flow diagram of some embodiments of a method for polishing a wafer and performing a first wafer cleaning process after the polishing process.
Figure 26:
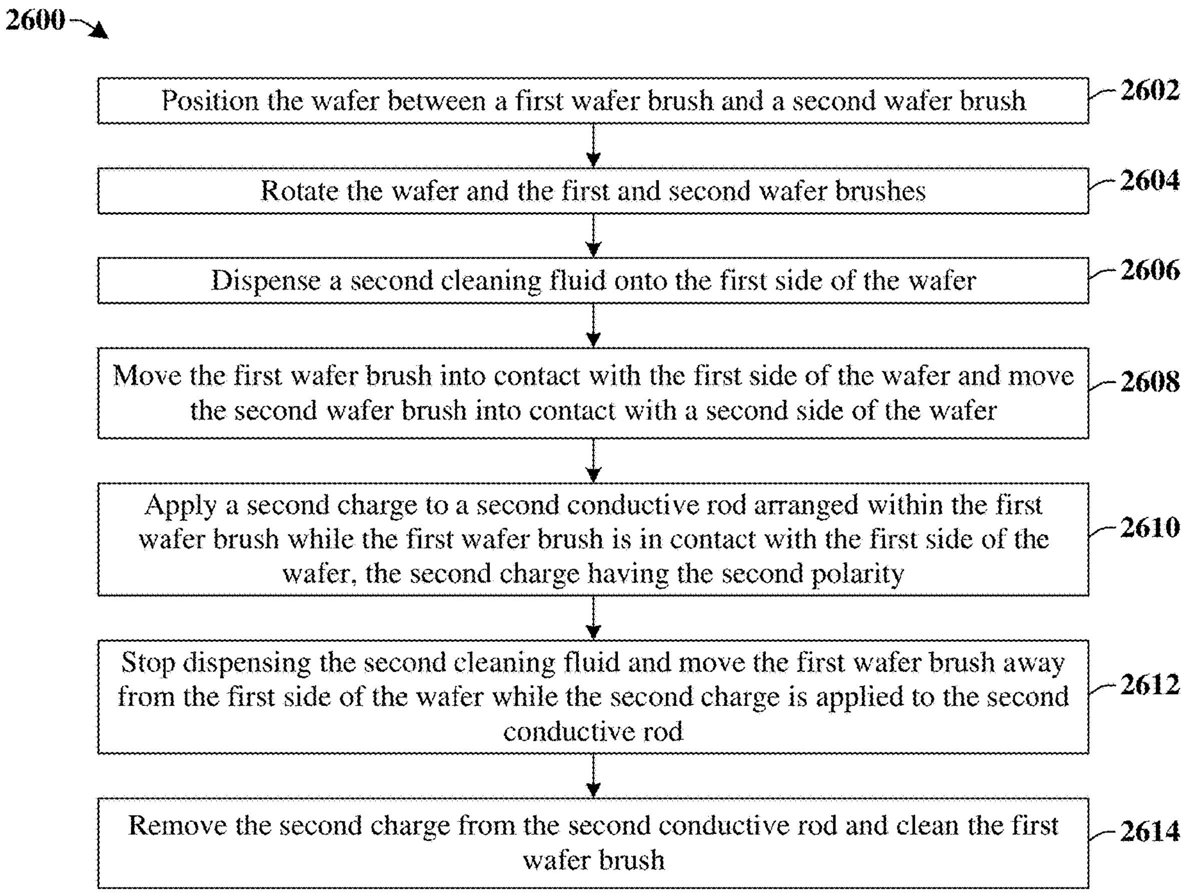
FIG. 26 illustrates a flow diagram of some embodiments of a method for performing a second wafer cleaning process after the polishing process.

FIG. 25 illustrates a flow diagram of some embodiments of a method 2500 for polishing a wafer and performing a first wafer cleaning process after the polishing process. FIG. 26 illustrates a flow diagram of some embodiments of a method 2600 for performing a second wafer cleaning process after the polishing process. While methods 2500, 2600 are illustrated and described below as a series of acts or events, it will be appreciated that the illustrated ordering of such acts or events are not to be interpreted in a limiting sense. For example, some acts may occur in different orders and/or concurrently with other acts or events apart from those illustrated and/or described herein. In addition, not all illustrated acts may be required to implement one or more aspects or embodiments of the description herein. Further, one or more of the acts depicted herein may be carried out in one or more separate acts and/or phases.

At block 2502, affix a wafer to a wafer carrier and position the wafer over a wafer platen. FIG. 15A illustrates a cross-sectional view 1500*a* and FIG. 15B illustrates a three-dimensional view 1500*b* of some embodiments corresponding to block 2502.

At block 2504, rotate the wafer platen and the wafer. FIG. 15A illustrates a cross-sectional view 1500*a* and FIG. 15B illustrates a three-dimensional view 1500*b* of some embodiments corresponding to block 2504.

At block 2506, dispense an abrasive slurry onto a polishing pad that is on the wafer platen, the abrasive slurry including charged abrasive particles having a first polarity. FIG. 16A illustrates a cross-sectional view 1600*a* and FIG. 16B illustrates a three-dimensional view 1600*b* of some embodiments corresponding to block 2506.

At block 2508, move the wafer toward the polishing pad so a first side of the wafer is in contact with the abrasive slurry and the polishing pad. FIG. 17A illustrates a cross-sectional view 1700*a* and FIG. 17B illustrates a three-dimensional view 1700*b* of some embodiments corresponding to block 2508.

At block 2510, stop dispensing the abrasive slurry and move the wafer away from the polishing pad so the first side of the wafer is a first distance away from the polishing pad. FIG. 18A illustrates a cross-sectional view 1800*a* and FIG. 18B illustrates a three-dimensional view 1800*b* of some embodiments corresponding to block 2510.

At block 2512, dispense a first cleaning fluid onto the polishing pad so the first cleaning fluid is in contact with both the polishing pad and the first side of the wafer. FIG. 19A illustrates a cross-sectional view 1900*a* and FIG. 19B illustrates a three-dimensional view 1900*b* of some embodiments corresponding to block 2512.

At block 2514, apply a first charge to a first conductive rod arranged within the wafer platen while the wafer is directly over the polishing pad and while the first cleaning fluid is directly between the first side of the wafer and the polishing pad, the first charge having a second polarity, opposite the first polarity. FIG. 19A illustrates a cross-sectional view 1900*a* and FIG. 19B illustrates a three-dimensional view 1900*b* of some embodiments corresponding to block 2514.

At block 2516, stop dispensing the first cleaning fluid and move the wafer further away from the polishing pad so the first side of the wafer is a second distance away from the polishing pad while the first charge is applied to the first conductive rod. In some embodiments, the rotation of the wafer and the wafer platen may be stopped at block 2516. FIG. 20A illustrates a cross-sectional view 2000*a* and FIG. 20B illustrates a three-dimensional view 2000*b* of some embodiments corresponding to block 2516.

At block 2518, remove the first charge from the first conductive rod and clean the polishing pad.

In some embodiments, method 2600 is performed after method 2500.

At block 2602, position the wafer between a first wafer brush and a second wafer brush. FIG. 21A illustrates a cross-sectional view 2100*a* and FIG. 21B illustrates a three-dimensional view 2100*b* of some embodiments corresponding to block 2602.

At block 2604, rotate the wafer and the first and second wafer brushes. FIG. 21A illustrates a cross-sectional view 2100*a* and FIG. 21B illustrates a three-dimensional view 2100*b* of some embodiments corresponding to block 2604.

At block 2606, dispense a second cleaning fluid onto the first side of the wafer. FIG. 22A illustrates a cross-sectional view 2200*a* and FIG. 22B illustrates a three-dimensional view 2200*b* of some embodiments corresponding to block 2606.

At block 2608, move the first wafer brush into contact with the first side of the wafer and move the second wafer brush into contact with a second side of the wafer. FIG. 23A illustrates a cross-sectional view 2300*a* and FIG. 23B illustrates a three-dimensional view 2300*b* of some embodiments corresponding to block 2608.

At block 2610, apply a second charge to a second conductive rod arranged within the first wafer brush while the first wafer brush is in contact with the first side of the wafer, the second charge having the second polarity. FIG. 23A illustrates a cross-sectional view 2300*a* and FIG. 23B illustrates a three-dimensional view 2300*b* of some embodiments corresponding to block 2610.

At block 2612, stop dispensing the second cleaning fluid and move the first wafer brush away from the first side of the wafer while the second charge is applied to the second conductive rod. The second wafer brush may be moved away from the second side of the wafer at block 2612. In some embodiments, the rotation of the wafer and the first and second wafer brushes may be stopped at block 2612. FIG. 24A illustrates a cross-sectional view 2400*a* and FIG. 24B illustrates a three-dimensional view 2400*b* of some embodiments corresponding to block 2612.

At block 2614, remove the second charge from the second conductive rod and clean the first wafer brush.

Thus, the present disclosure relates to a process tool and a method for removing charged particles from a wafer after polishing the wafer to reduce defects along the wafer after the polishing.

Accordingly, in some embodiments, the present disclosure relates to a process tool including a first voltage supply, a second voltage supply, and a wafer platen. A polishing pad is on a top surface of the wafer platen. A wafer carrier is over the polishing pad and configured to hold a wafer over the polishing pad. A slurry dispenser is over the polishing pad and configured to dispense an abrasive slurry including a plurality of charged abrasive particles having a first polarity onto the polishing pad. A first conductive rod is within the wafer platen. The first conductive rod is coupled to the first voltage supply. A wafer roller is configured to support and rotate the wafer. A first wafer brush is arranged beside the wafer roller. A second conductive rod is within the first wafer brush. The second conductive rod is coupled to the second voltage supply. The first voltage supply is configured to apply a first charge having a second polarity, opposite the first polarity, to the first conductive rod. The second voltage supply is configured to apply a second charge having the second polarity to the second conductive rod.

In other embodiments, the present disclosure relates to a method. The method includes affixing a wafer to a wafer carrier. The wafer is positioned over a polishing pad that is disposed on a wafer platen. The wafer platen and the wafer are rotated. An abrasive slurry is dispensed onto the polishing pad. The abrasive slurry includes a plurality of charged abrasive particles having a first polarity. A first side of the wafer is moved into contact with the abrasive slurry and the polishing pad. The first side of the wafer is moved a first distance away from the polishing pad. A first cleaning fluid is dispensed onto the polishing pad while the wafer is the first distance away from the polishing pad so the first cleaning fluid is directly between the polishing pad and the first side of the wafer. A first charge having a second polarity, opposite the first polarity, is applied to a first conductive rod arranged within the wafer platen while the wafer is directly over the polishing pad and while the first cleaning fluid is directly between the first side of the wafer and the polishing pad. The first side of the wafer is moved a second distance away from the polishing pad while the first charge is applied to the first conductive rod. The second distance is different from the first distance.

In yet other embodiments, the present disclosure relates to a method. The method includes polishing a first side of a wafer with an abrasive slurry. The abrasive slurry includes a plurality of charged abrasive particles having a first polarity. The wafer is arranged on a wafer roller and adjacent to a first wafer brush. The wafer and the first wafer brush are rotated. A first cleaning fluid is dispensed onto the first side of the wafer. The first wafer brush is moved into contact with the first side of the wafer. A first charge having a second polarity, opposite the first polarity, is applied to a first conductive rod arranged within the first wafer brush while the first wafer brush is in contact with the first side of the wafer. The first wafer brush is moved away from the first side of the wafer while the first charge is applied to the first conductive rod.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method comprising:

providing a slurry to a polishing pad that is disposed on a wafer platen, the slurry comprising a plurality of electrically charged abrasive particles having a first electrical polarity;

moving a first side of a wafer into contact with the slurry and the polishing pad;

while the wafer is directly over the polishing pad, applying a first electrical charge having a second electrical polarity, opposite the first electrical polarity, to a first conductive rod arranged within the wafer platen;

moving the first side of the wafer away from the polishing pad while the first electrical charge is applied to the first conductive rod;

moving a first wafer brush into contact with the first side of the wafer;

while the first wafer brush is in contact with the first side of the wafer, applying a second electrical charge having the second electrical polarity, opposite the first electrical polarity, to a second conductive rod arranged within the first wafer brush; and moving the first wafer brush away from the first side of the wafer while the second first electrical charge is applied to the second conductive rod.

2. The method of claim 1, wherein moving the first side of the wafer into contact with the slurry and the polishing pad causes material to be removed from the first side of the wafer.

3. The method of claim 1, further comprising:

removing the second electrical charge from the second conductive rod after moving the first wafer brush away from the first side of the wafer; and cleaning the first wafer brush after the second electrical charge is removed from the second conductive rod to remove electrically charged abrasive particles of the plurality of electrically charged abrasive particles from the first wafer brush.

4. The method of claim 1, further comprising:

moving a second wafer brush into contact with a second side of the wafer when moving the first wafer brush into contact with the first side of the wafer.

5. The method of claim 1, further comprising:

moving the wafer to a mega-sonic module and processing the wafer in the mega-sonic module after moving the first side of the wafer away from the polishing pad and before moving the first wafer brush into contact with the first side of the wafer.

6. The method of claim 1, further comprising:

rotating the wafer and the wafer platen in different directions when moving the first side of the wafer into contact with the slurry and the polishing pad.

7. A method comprising:

positioning a wafer over a polishing pad that is disposed on a wafer platen;

rotating the wafer platen and the wafer;

dispensing an abrasive slurry onto the polishing pad, the abrasive slurry comprising a plurality of charged abrasive particles having a first electrical polarity;

moving a first side of the wafer into contact with the abrasive slurry and the polishing pad while rotating the wafer platen and the wafer;

moving the first side of the wafer a first distance away from the polishing pad;

while the wafer is directly over the polishing pad and the wafer is the first distance away from the polishing pad, applying a first electrical charge having a second electrical polarity, opposite the first electrical polarity, to a first conductive rod arranged within the wafer platen;

moving the first side of the wafer a second distance away from the polishing pad while the first electrical charge is applied to the first conductive rod, wherein the second distance is greater than the first distance;

moving a first wafer brush into contact with the first side of the wafer;

while the first wafer brush is in contact with the first side of the wafer, applying a second electrical charge having the second electrical polarity, opposite the first electrical polarity, to a second conductive rod arranged within the first wafer brush; and moving the first wafer brush away from the first side of the wafer while the second electrical charge is applied to the second conductive rod.

8. The method of claim 7, further comprising:

dispensing a first cleaning fluid onto the polishing pad while the wafer is the first distance away from the polishing pad so the first cleaning fluid is directly between the polishing pad and the first side of the wafer, wherein the first electrical charge is applied to first conductive rod while the first cleaning fluid is directly between the first side of the wafer and the polishing pad.

9. The method of claim 7, further comprising:

dispensing a second cleaning fluid onto the first side of the wafer while moving the first wafer brush into contact with the first side of the wafer.

10. The method of claim 7, wherein applying the first electrical charge to the first conductive rod comprises coupling the first conductive rod to a first voltage supply, wherein applying the second electrical charge to the second conductive rod comprises coupling the second conductive rod to a second voltage supply, separate from the first voltage supply.

11. The method of claim 7, wherein applying the first electrical charge to the first conductive rod comprises coupling a first end of the first conductive rod to a first terminal of a first voltage supply and coupling a second end of the first conductive rod, opposite the first end, to a second terminal of the first voltage supply.

12. The method of claim 7, further comprising:

removing the first electrical charge from the first conductive rod after moving the first side of the wafer the second distance away from the polishing pad; and removing the charged abrasive particles from the polishing pad after removing the first electrical charge from the first conductive rod.

13. The method of claim 7, wherein the wafer platen and the wafer are rotated in the same direction while the first side of the wafer is moved into contact with the abrasive slurry and the polishing pad.

14. The method of claim 7, further comprising:

rotating the wafer platen and the wafer while moving the first side of the wafer the first distance away from the polishing pad;

rotating the wafer platen and the wafer while applying the first electrical charge to the first conductive rod; and rotating the wafer platen and the wafer while moving the first side of the wafer the second distance away from the polishing pad.

15. A method comprising:

providing a slurry to a polishing pad that is disposed on a wafer platen, the slurry comprising a plurality of electrically charged abrasive particles having a first electrical polarity;

moving a first side of a wafer into contact with the slurry and the polishing pad;

while the wafer is directly over the polishing pad, applying a first electrical charge having a second electrical polarity, opposite the first electrical polarity, to a first conductive rod arranged within the wafer platen;

moving the first side of the wafer away from the polishing pad while the first electrical charge is applied to the first conductive rod;

rotating the wafer and a first wafer brush;

moving the first wafer brush into contact with the first side of the wafer while rotating the wafer and the first wafer brush;

while the first wafer brush is in contact with the first side of the wafer and while rotating the wafer and the first wafer brush, applying a second electrical charge having the second electrical polarity, opposite the first electrical polarity, to a second conductive rod arranged within the first wafer brush; and moving the first wafer brush away from the first side of the wafer while the second electrical charge is applied to the second conductive rod.

16. The method of claim 15, further comprising:

arranging the wafer on a wafer roller and adjacent to the first wafer brush, wherein the wafer roller rotates the wafer.

17. The method of claim 15, wherein the first wafer brush is moved into contact with the first side of the wafer after moving the first side of the wafer away from the polishing pad.

18. The method of claim 15, further comprising:

dispensing a first cleaning fluid onto the first side of the wafer from a tube disposed within the second conductive rod.

19. The method of claim 15, wherein a magnitude of the second electrical charge is different than a magnitude of the first electrical charge.

20. The method of claim 15, further comprising:

rotating the wafer and the first wafer brush while moving the first wafer brush away from the first side of the wafer.

* * * * *